US011080602B1

(12) United States Patent
Oroojlooyjadid et al.

(10) Patent No.: US 11,080,602 B1
(45) Date of Patent: Aug. 3, 2021

(54) UNIVERSAL ATTENTION-BASED REINFORCEMENT LEARNING MODEL FOR CONTROL SYSTEMS

(71) Applicant: SAS Institute Inc., Cary, NC (US)

(72) Inventors: Afshin Oroojlooyjadid, North East, MD (US); Mohammadreza Nazari, Champaign, IL (US); Davood Hajinezhad, Cary, NC (US); Jorge Manuel Gomes da Silva, Durham, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 17/177,694

(22) Filed: Feb. 17, 2021

Related U.S. Application Data

(60) Provisional application No. 63/056,416, filed on Jul. 24, 2020, provisional application No. 63/045,067, filed on Jun. 27, 2020.

(51) Int. Cl.
*G06N 20/00* (2019.01)
*G06N 3/08* (2006.01)
(Continued)

(52) U.S. Cl.
CPC ............. *G06N 3/08* (2013.01); *G06F 17/18* (2013.01); *G06N 20/00* (2019.01); *G08G 1/093* (2013.01)

(58) Field of Classification Search
None
See application file for complete search history.

(56) References Cited

U.S. PATENT DOCUMENTS 9,818,297 B2   11/2017   El-Tantawy et al.
10,061,316 B2   8/2018   Nishi
(Continued)

FOREIGN PATENT DOCUMENTS

CA   2859049 C    6/2018
EP   3620880 A1   3/2020
(Continued)

OTHER PUBLICATIONS

Lowrie, P., "SCATS—Sydney Co-Ordinated Adaptive Traffic System: A Traffic Responsive Method of Controlling Urban Traffic", Roads and Traffic Authority, Jan. 1, 1990, pp. 1-33, RTA.
(Continued)

*Primary Examiner* — David R Vincent
(74) *Attorney, Agent, or Firm* — Coats + Bennett, PLLC

(57) ABSTRACT

A computing system trains a reinforcement learning model comprising multiple different attention model components. The reinforcement learning model trains on training data of a first environment (e.g., a first traffic intersection). The reinforcement learning model trains by training a state attention computer model on the training data that weighs each of respective inputs of a respective state. The reinforcement learning model trains by training an action attention computer model that determines a probability of switching from a first action to a second action of the first set of the multiple candidate actions (e.g., changing traffic colors of traffic lights).

Alternatively, or additionally, a computing system generates an indication of a selected outcome according to the reinforcement learning model and sends a selection output to the second environment (e.g., a second traffic intersection with more lanes than the first traffic intersection) to implement the selected action in the second environment.

30 Claims, 27 Drawing Sheets

(51) Int. Cl.
*G08G 1/09* (2006.01)
*G06F 17/18* (2006.01)

(56) References Cited

U.S. PATENT DOCUMENTS

| | | | |
|---|---|---|---|
| 2013/0176146 | A1 | 7/2013 | Dusparic et al. |
| 2015/0102945 | A1 | 4/2015 | El-Tantawy et al. |
| 2018/0011488 | A1 | 1/2018 | Nishi |
| 2018/0190111 | A1 | 7/2018 | Green et al. |
| 2018/0373245 | A1 | 12/2018 | Nishi |
| 2019/0050729 | A1 | 2/2019 | Lakshmanan et al. |
| 2019/0113919 | A1 | 4/2019 | Englard et al. |
| 2020/0033868 | A1 | 1/2020 | Palanisamy et al. |
| 2020/0033869 | A1 | 1/2020 | Palanisamy et al. |
| 2020/0189597 | A1 | 6/2020 | Veronese et al. |
| 2021/0073563 | A1* | 3/2021 | Karianakis ............... G06N 3/08 |

FOREIGN PATENT DOCUMENTS

| | | |
|---|---|---|
| EP | 3667556 A1 | 6/2020 |
| WO | 2011157745 A1 | 12/2011 |
| WO | 2016202009 A1 | 12/2016 |
| WO | 2019079530 A1 | 4/2019 |

OTHER PUBLICATIONS

Hunt, P. et al., "SCOOT—A Traffic Responsive Method of Coordinating Signals", TRRL Laboratory Report 1014, Jan. 1, 1981, pp. 1-45, Transport and Road Research Laboratory.

Hunt, P. et al., "The SCOOT On-line Traffic Signal Optimisation Technique", Traffic Engineering & Control, Apr. 1, 1982, pp. 190-192, Transport and Road Research Laboratory.

TRL Software, "SCOOT—Adaptive Traffic Control System", Aug. 1, 2018, pp. 1-2, retrieved on Jul. 24, 2020, retrieved from Internet: https://trlsoftware.com/wp-content/uploads/2018/08/SCOOT.pdf.

TRL Software, "SCOOT—Split Cycle Offset Optimisation Technique", Jan. 1, 2020, pp. 1-5, retrieved on Jun. 27, 2020, retrieved from Internet: https://trlsoftware.com/products/traffic-control/scoot/.

SAS Help Center, "Sequence Action Set: Details", May 19, 2019, pp. 1-2, retrieved on Jul. 19, 2020, retrieved from Internet: https://go.documentation.sas.com/?docsetId=casanpg&docsetVersion=8.3&docsetTarget=n0zyqff59pcxecn1ip2o2zebdu1d.htm&locale=en.

Wei, H., "PressLight (KDD 2019)", Jun. 17, 2019, pp. 1-6, retrieved on Jun. 27, 2020, retrieved from Internet: https://sites.psu.edu/huawei/2019/06/17/presslight-kdd-2019/.

Zang, X. et al., "MetaLight: Value-Based Meta-Reinforcement Learning for Traffic Signal Control", Proceedings of the AAAI Conference on Artificial Intelligence, vol. 34 No. 1, Apr. 3, 2020, pp. 1153-1160, Association for the Advancement of Artificial Intelligence.

Zheng, G. et al., "Learning to Simulate Vehicle Trajectories from Demonstrations", 2020 IEEE 36th International Conference on Data Engineering (ICDE), Apr. 20, 2020, pp. 1-4, IEEE.

"SCATS—Homepage", Jan. 1, 2020, pp. 1-10, retrieved on Jun. 27, 2020, retrieved from Internet: https://scats.nsw.gov.au.

Wei, H., "CoLight (CIKM 2019)", Sep. 15, 2019, pp. 1-6, retrieved on Jun. 27, 2020, retrieved from Internet: https://sites.psu.edu/huawei/2019/09/15/colight-cikm-2019/.

Zheng, G. et al., "Learning Phase Competition for Traffic Signal Control", CIKM '19: Proceedings of the 28th ACM International Conference on Information and Knowledge Management, Nov. 3, 2019, pp. 1-10, Association for Computing Machinery.

Chen, C. et al., "Toward a Thousand Lights: Decentralized Deep Reinforcement Learning for Large-Scale Traffic Signal Control", Proceedings of the AAAI Conference on Artificial Intelligence, vol. 34 No. 4, Apr. 3, 2020, pp. 3414-3421, Association for the Advancement of Artificial Intelligence.

Xiong, Y. et al., "Learning Traffic Signal Control from Demonstrations", CIKM '19: Proceedings of the 28th ACM International Conference on Information and Knowledge, Nov. 3, 2019, pp. 2289-2292, Association for Computing Machinery.

Wei, H. et al., "IntelliLight: A Reinforcement Learning Approach for Intelligent Traffic Light Control", KDD '18: Proceedings of the 24th ACM SIGKDD International Conference on Knowledge Discovery & Data Mining, Jul. 1, 2018, pp. 2496-2505, Association for Computing Machinery.

Zhang, H. et al., "CityFlow: A Multi-Agent Reinforcement Learning Enviroment for Large Scale City Traffic Scenario", arXiv:1905.05217v1, May 13, 2019, pp. 1-5, arXiv.

* cited by examiner

UNIVERSAL ATTENTION-BASED REINFORCEMENT LEARNING MODEL FOR CONTROL SYSTEMS

CROSS-REFERENCE TO RELATED APPLICATIONS

This application claims the benefit of, and priority based on 35 U.S.C. § 119 to U.S. Provisional Application No. 63/056,416, filed Jul. 24, 2020 and U.S. Provisional Application No. 63/045,067, filed Jun. 27, 2020, the disclosures of each of which are incorporated herein by reference in their entirety.

BACKGROUND

Traffic congestion is a feature of urban environments. Traffic congestion is mitigated by road expansion projects, road allowance rules, or traffic signal control. Traffic signal control includes rule-based fixed cycles and adaptive measures that consider some current information such as approaches vehicles.

SUMMARY

In an example embodiment, a computer-program product tangibly embodied in a non-transitory machine-readable storage medium is provided. The computer-program product includes instructions to cause a computing system to generate an indication of a selected outcome according to a reinforcement learning model. Alternatively, or additionally, the computer-program product includes instructions to cause a computing system to train a reinforcement learning model.

For instance, the computer-program product includes instructions to cause a computing system to access a reinforcement learning model comprising multiple different attention computer model components. The reinforcement learning model was trained on training data of a first environment. The reinforcement learning model was trained by receiving the training data indicating multiple states of a respective first set of objects entering or waiting to enter a first environment. The reinforcement learning model was trained by determining a first set of multiple candidate actions for the respective first set of objects. Each respective action of the first set of multiple candidate actions comprises a distinct stage of transition for a subset of objects of the respective first set of objects in the first environment. The reinforcement learning model was trained by accessing an objective for selecting a respective action of the first set of multiple candidate actions. The reinforcement learning model was trained by training a state attention computer model on the training data that weighs each of respective inputs of a respective state of the multiple states. The reinforcement learning model was trained by weighing, from the state attention computer model, each entry point of entry points of the first environment to account for importance for each corresponding entry point according to the objective. The reinforcement learning model was trained by inputting a representation of entry points of a respective action into a neural network to produce neural network output for the respective action for the respective state of the multiple states. The reinforcement learning model was trained by training, on the neural network output, an action attention computer model that determines a probability of switching from a first action of the first set of the multiple candidate actions to a second action of the first set of the multiple candidate actions. The reinforcement learning model was trained by generating, according to the action attention computer model, an indication of a selected action of the multiple candidate actions; and receiving, from the first environment, feedback for acting according to the selected action. The computer-program product includes instructions to cause a computing system to receive input data indicating a first state of a second set of objects entering or waiting to enter a second environment. The computer-program product includes instructions to cause a computing system to determine a second set of multiple candidate actions for the second set of objects. The computer-program product includes instructions to cause a computing system to generate an indication of a selected action of the second set of multiple candidate actions for the input data according to the reinforcement learning model comprising the multiple different attention computer model components. The computer-program product includes instructions to cause a computing system to send a selection output to the second environment to implement the selected action in the second environment.

In another example embodiment, a computing system is provided. The computing system includes, but is not limited to, a processor and memory. The memory contains instructions that when executed by the processor control the computing system to generate an indication of a selected outcome according to a reinforcement learning model. Alternatively, or additionally, the memory contains instructions that when executed by the processor control the computing system to train a reinforcement learning model.

In another example embodiment, a method of generating an indication of a selected outcome according to a reinforcement learning model is provided. Alternatively, or additionally a method of training a reinforcement learning model is provided.

Other features and aspects of example embodiments are presented below in the Detailed Description when read in connection with the drawings presented with this application.

DETAILED DESCRIPTION

Figure 1:
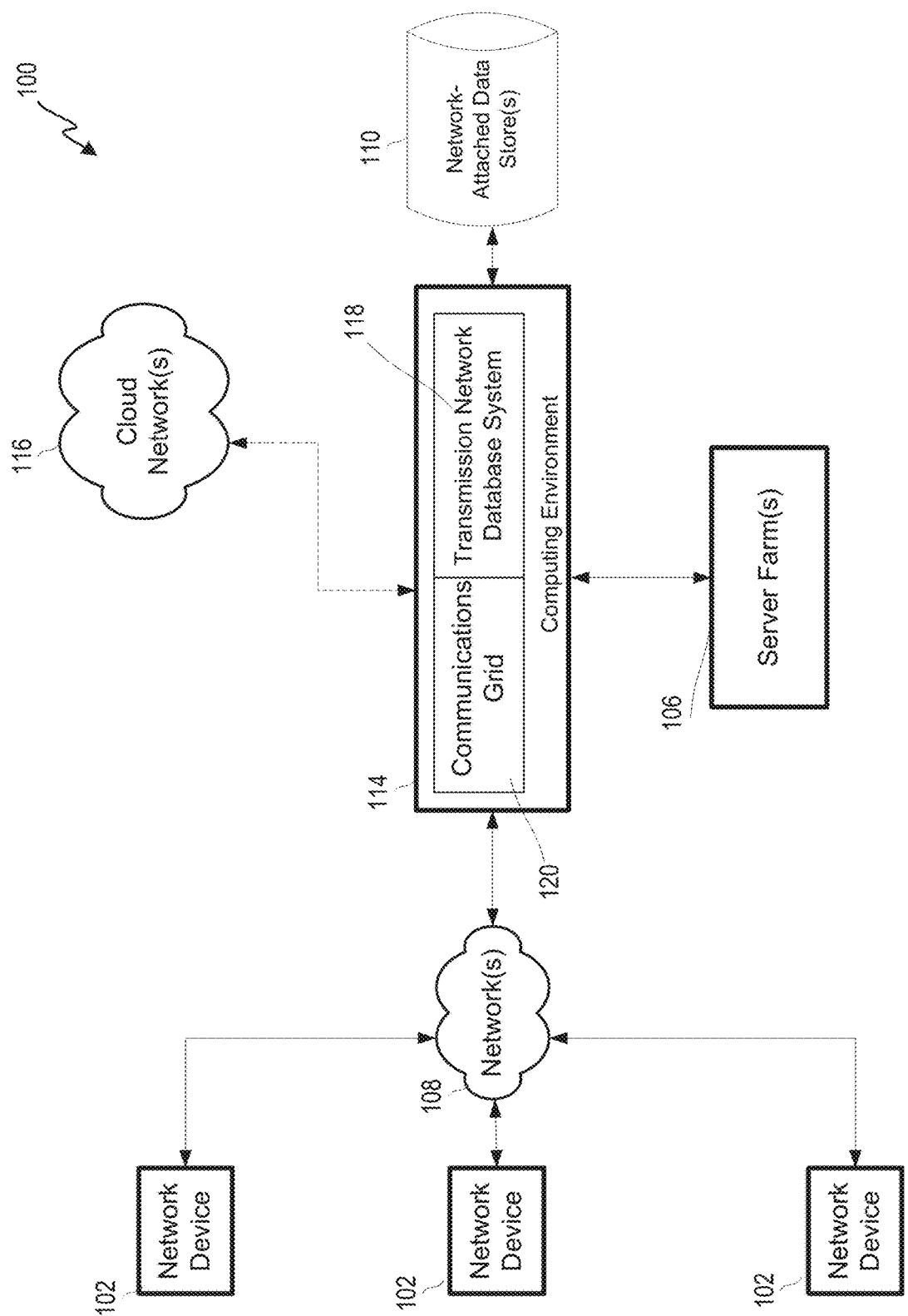
FIG. 1 illustrates a block diagram that provides an illustration of the hardware components of a computing system, according to at least one embodiment of the present technology.

With the emergence of urbanization and the increase in household car ownership, traffic congestion has been one of the major challenges in many highly populated cities. Traffic congestion can be mitigated by one or more of road expansion and correction, sophisticated road allowance rules, or improved traffic signal controlling. For instance, traffic signal control may be used to control a traffic light at one or more lanes of a traffic intersection. The traffic light may provide a traffic signal (e.g., by changing colors of the traffic light) to indicate to vehicles that they can enter the intersection. The traffic light device can also be referred to as a traffic signal. Although any of these solutions for traffic congestion could decrease the travel times and fuel costs, optimizing the traffic signals may be more convenient due to the limited funding resources and opportunity of finding more effective strategies. One or more embodiments are useful for controlling traffic congestion at intersections by optimizing the traffic signals of traffic lights.

Previous approaches for traffic congestion control by a traffic light have shortcomings such as that they require training of the computing system controlling the traffic light for each new intersection with a different structure or traffic flow distribution. In one or more embodiments, a computing system trains a single, universal model for intersections with different number of roads, lanes, phases (possible signals), and traffic flow. For instance, one or more embodiments use a deep reinforcement learning model which incorporates two attention models. The first attention model is introduced to handle different numbers of roads-lanes; and the second attention model is intended for enabling decision-making with different number of phases in an intersection. This type of model can work for different intersection configurations if a similar configuration is represented in the training set.

The reinforcement learning model can also be applied to other control problems. For instance, the reinforcement learning model can be useful to a wide range of applications such as Assemble-to-Order Systems, Dynamic Matching Problem, and Wireless Resource Allocation problems. Similar to traffic control, each of these problems has to deal with the varying number of inputs and outputs where the reinforcement learning model is particular useful. Like different intersections, a model trained for one type of system can be applied to another different system. For example, a model trained for an assemble-to-order system in one factory can be applied to another unobserved assemble-to-order system in another factory.

In the following description, for the purposes of explanation, specific details are set forth in order to provide a thorough understanding of embodiments of the technology. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the technology as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional operations not included in a figure. A process may correspond to a method, a function, a procedure, a subroutine, a subprogram, etc. When a process corresponds to a function, its termination can correspond to a return of the function to the calling function or the main function.

Systems depicted in some of the figures may be provided in various configurations. In some embodiments, the systems may be configured as a distributed system where one or more components of the system are distributed across one or more networks in a cloud computing system.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
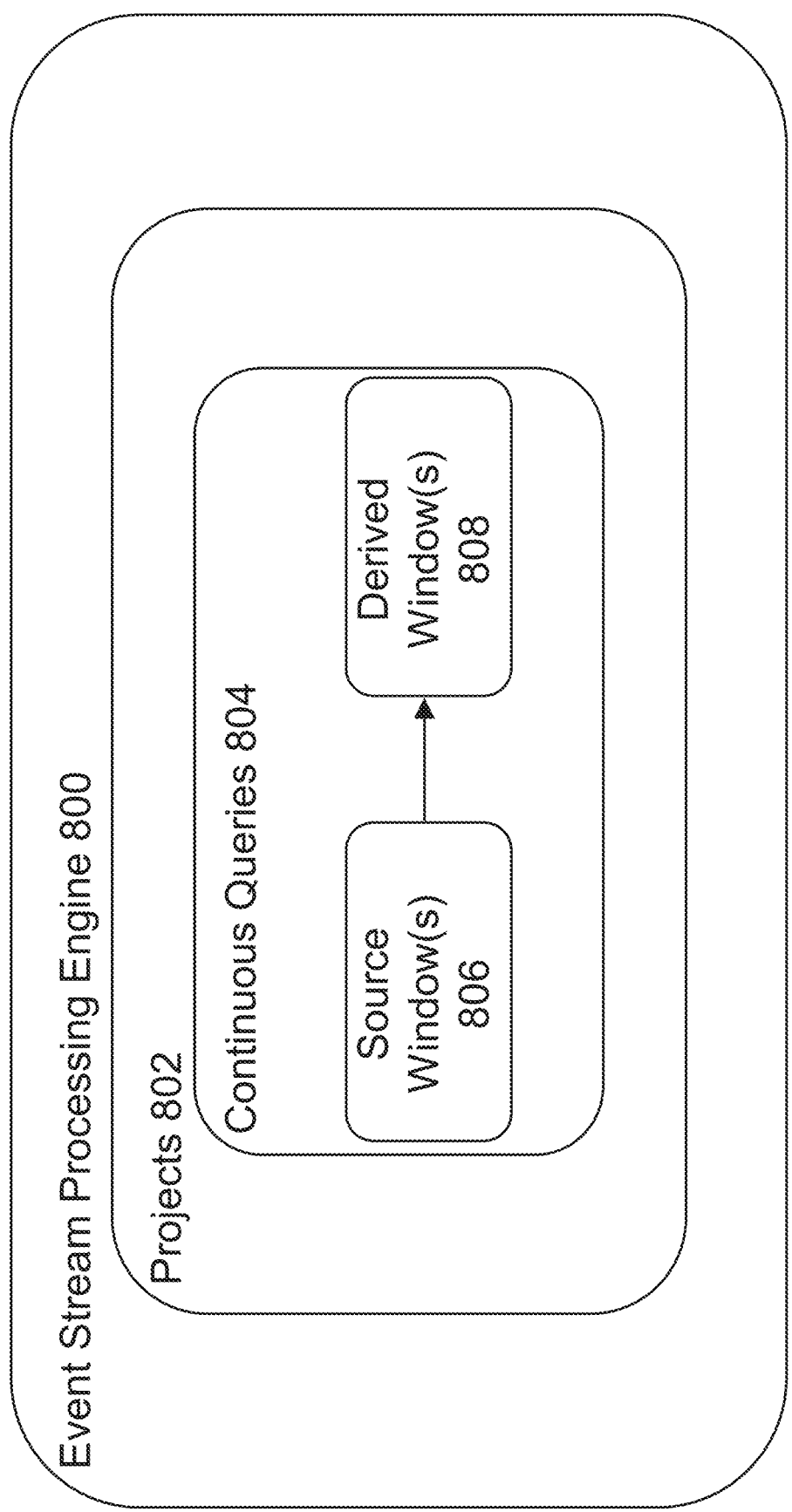
FIG. 8 illustrates a block diagram including components of an Event Stream Processing Engine (ESPE), according to at least one embodiment of the present technology.
Figure 9:
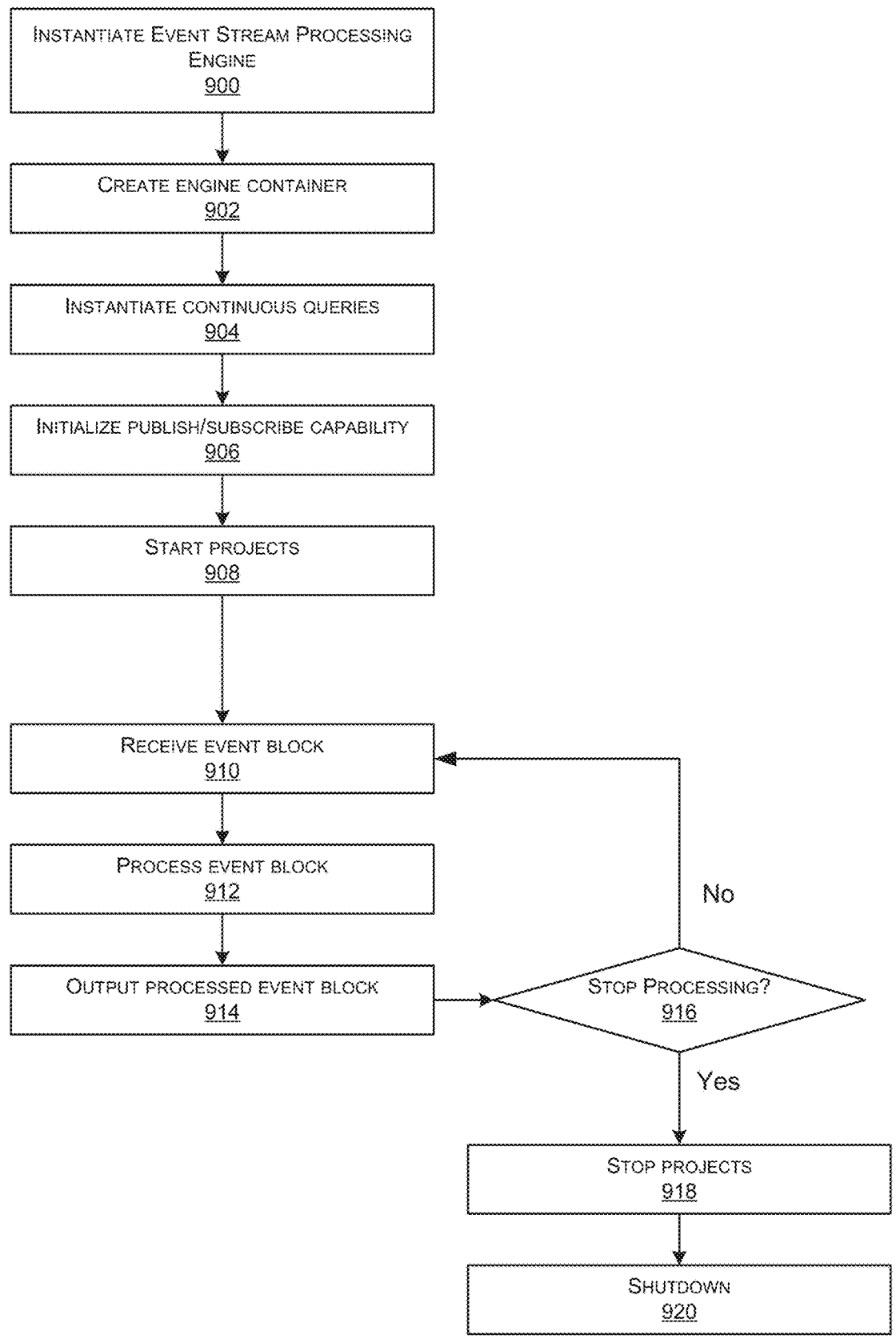
FIG. 9 illustrates a flow chart showing an example process including operations performed by an event stream processing engine, according to at least one embodiment of the present technology.
Figure 10:
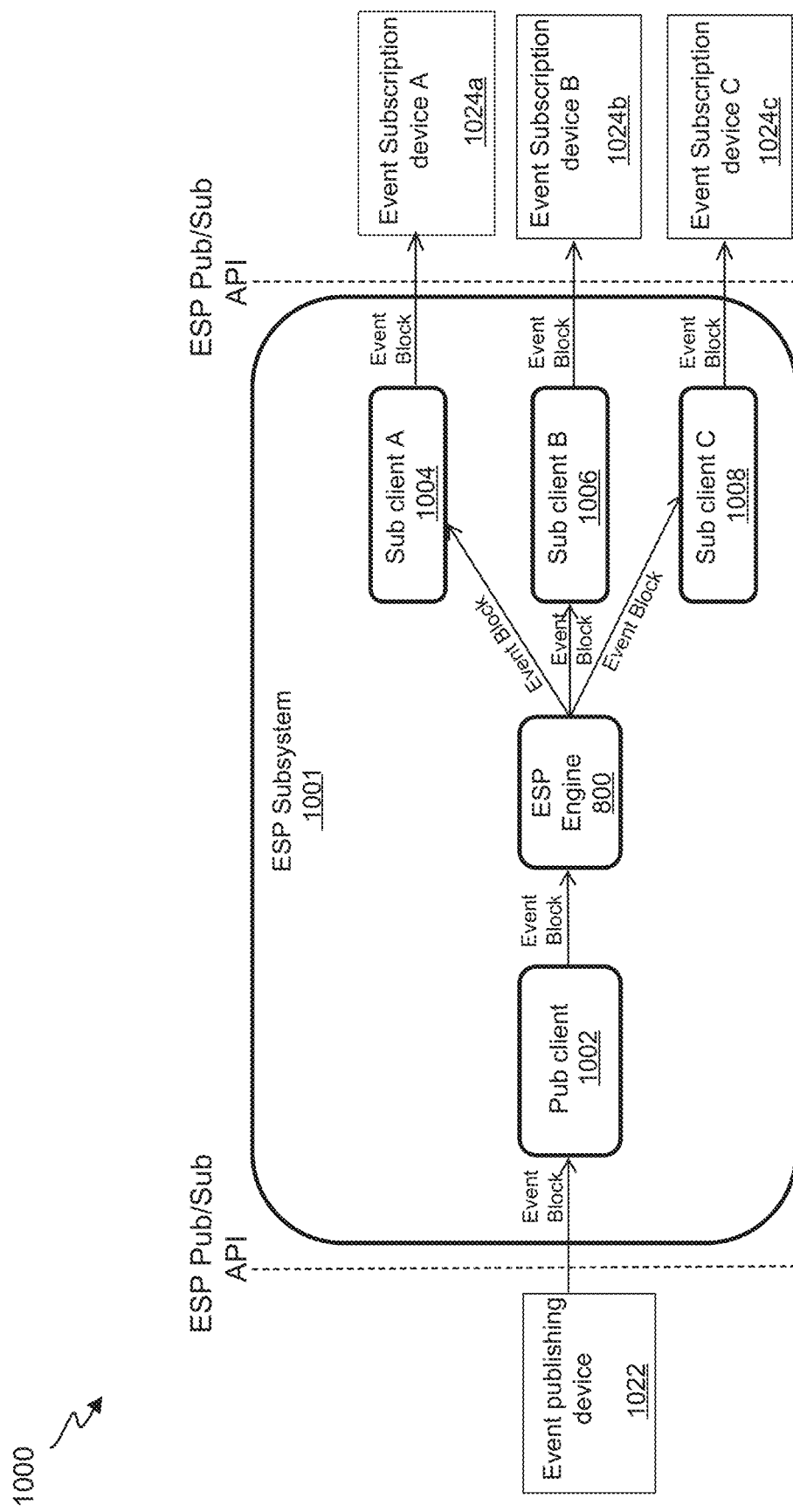
FIG. 10 illustrates an ESP system interfacing between a publishing device and multiple event subscribing devices, according to at least one embodiment of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices, and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may include one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between a device and connection management system 150, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN).

A wireless network may include a wireless interface or combination of wireless interfaces. As an example, a network in the one or more networks 108 may include a short-range communication channel, such as a Bluetooth or a Bluetooth Low Energy channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. IoT may be implemented in various areas, such as for access (technologies that get data and move it), embed-ability (devices with embedded sensors), and services. Industries in the IoT space may include automotive (connected car), manufacturing (connected factory), smart cities, energy and retail. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
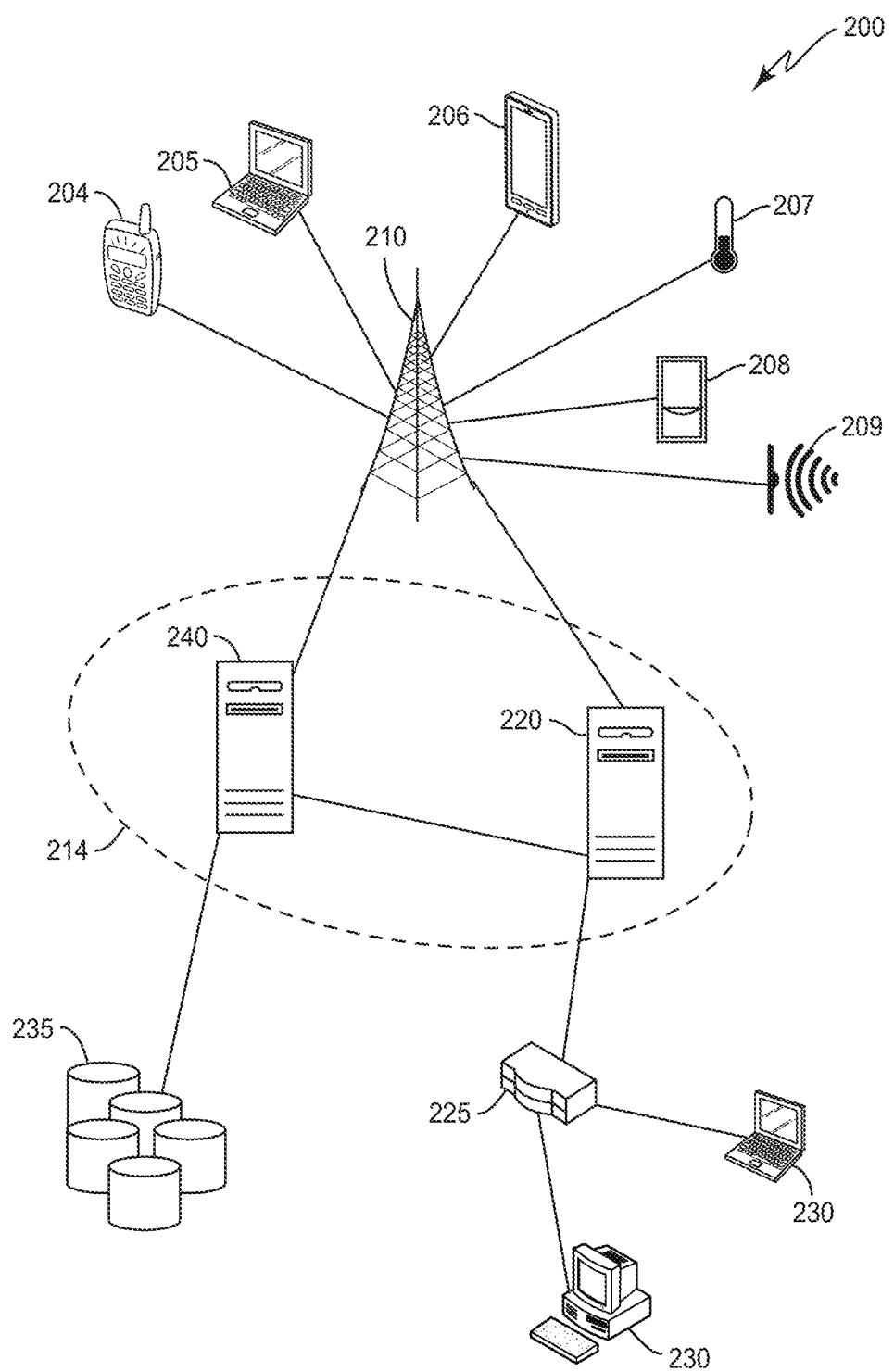
FIG. 2 illustrates an example network including an example set of devices communicating with each other over an exchange system and via a network, according to at least one embodiment of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
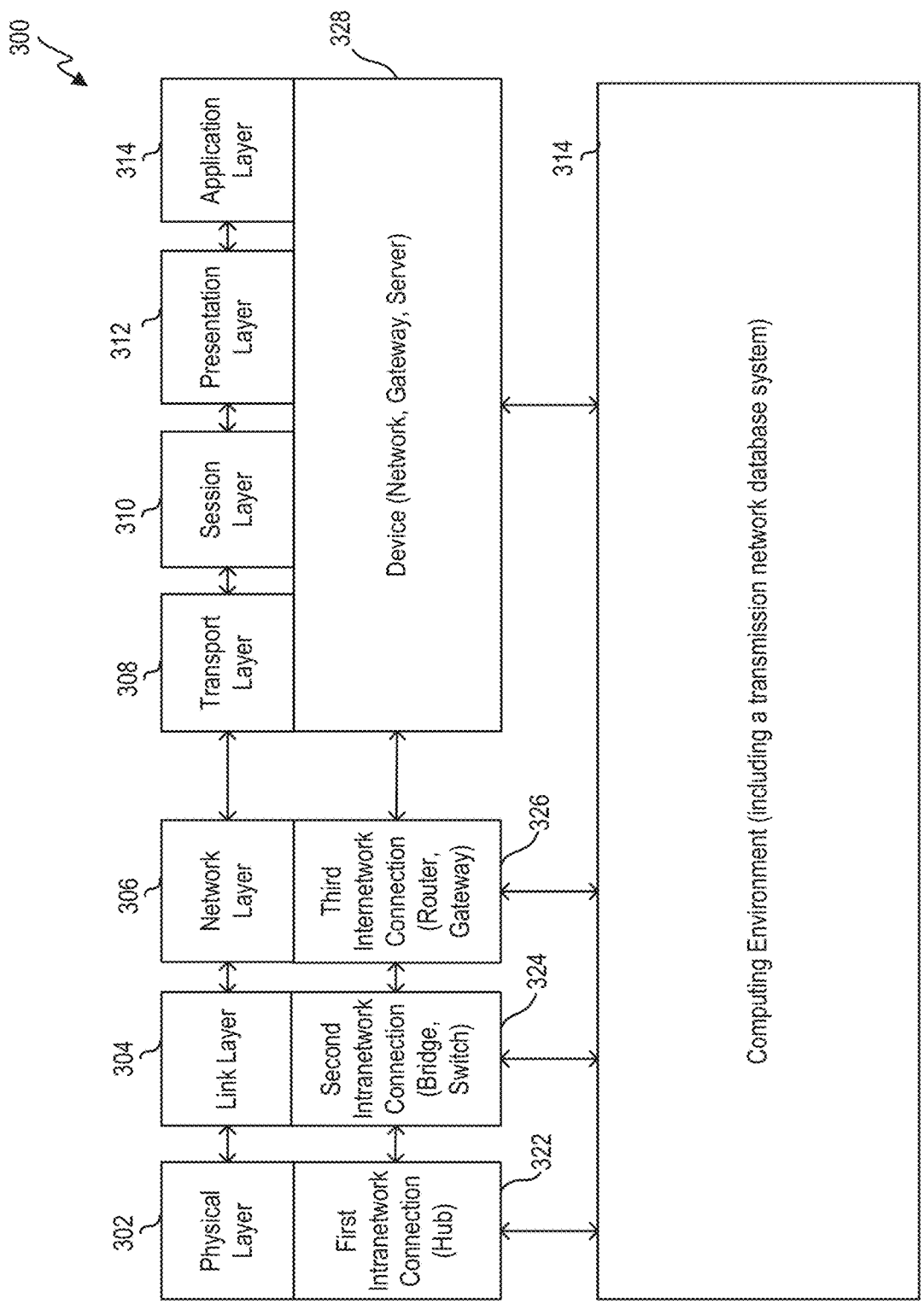
FIG. 3 illustrates a representation of a conceptual model of a communications protocol system, according to at least one embodiment of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 302-314. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data and is the farthest layer from the user in a communications system. On the other hand, the application layer is the highest layer because it interacts directly with a software application.

As noted, the model includes a physical layer 302. Physical layer 302 represents physical communication and can define parameters of that physical communication. For example, such physical communication may come in the form of electrical, optical, or electromagnetic signals. Physical layer 302 also defines protocols that may control communications within a data transmission network.

Link layer 304 defines links and mechanisms used to transmit (i.e., move) data across a network. The link layer manages node-to-node communications, such as within a grid computing environment. Link layer 304 can detect and correct errors (e.g., transmission errors in the physical layer 302). Link layer 304 can also include a media access control (MAC) layer and logical link control (LLC) layer.

Network layer 306 defines the protocol for routing within a network. In other words, the network layer coordinates transferring data across nodes in a same network (e.g., such as a grid computing environment). Network layer 306 can also define the processes used to structure local addressing within the network.

Transport layer 308 can manage the transmission of data and the quality of the transmission and/or receipt of that data. Transport layer 308 can provide a protocol for transferring data, such as, for example, a Transmission Control Protocol (TCP). Transport layer 308 can assemble and disassemble data frames for transmission. The transport layer can also detect transmission errors occurring in the layers below it.

Session layer 310 can establish, maintain, and manage communication connections between devices on a network. In other words, the session layer controls the dialogues or nature of communications between network devices on the network. The session layer may also establish checkpointing, adjournment, termination, and restart procedures.

Presentation layer 312 can provide translation for communications between the application and network layers. In other words, this layer may encrypt, decrypt and/or format data based on data types known to be accepted by an application or network layer.

Application layer 314 interacts directly with software applications and end users, and manages communications between them. Application layer 314 can identify destinations, local resource states or availability and/or communication content or formatting using the applications.

Intra-network connection components 322 and 324 are shown to operate in lower levels, such as physical layer 302 and link layer 304, respectively. For example, a hub can operate in the physical layer and a switch can operate in the link layer. Inter-network connection components 326 and 328 are shown to operate on higher levels, such as layers 306-314. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
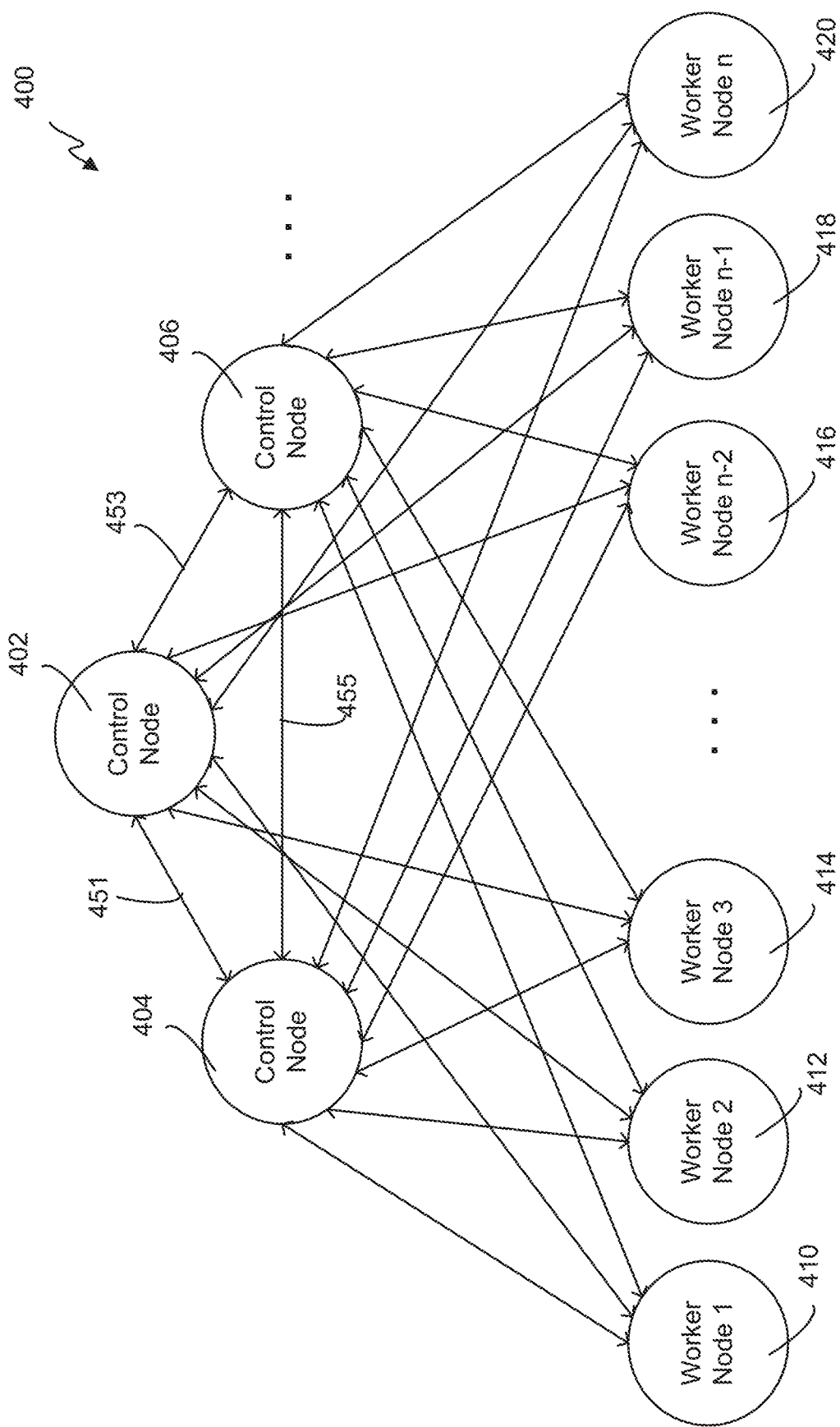
FIG. 4 illustrates a communications grid computing system including a variety of control and worker nodes, according to at least one embodiment of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be receive or stored by a machine other than a control node (e.g., a Hadoop data node).

Control nodes may maintain knowledge of the status of the nodes in the grid (i.e., grid status information), accept work requests from clients, subdivide the work across worker nodes, coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes). The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
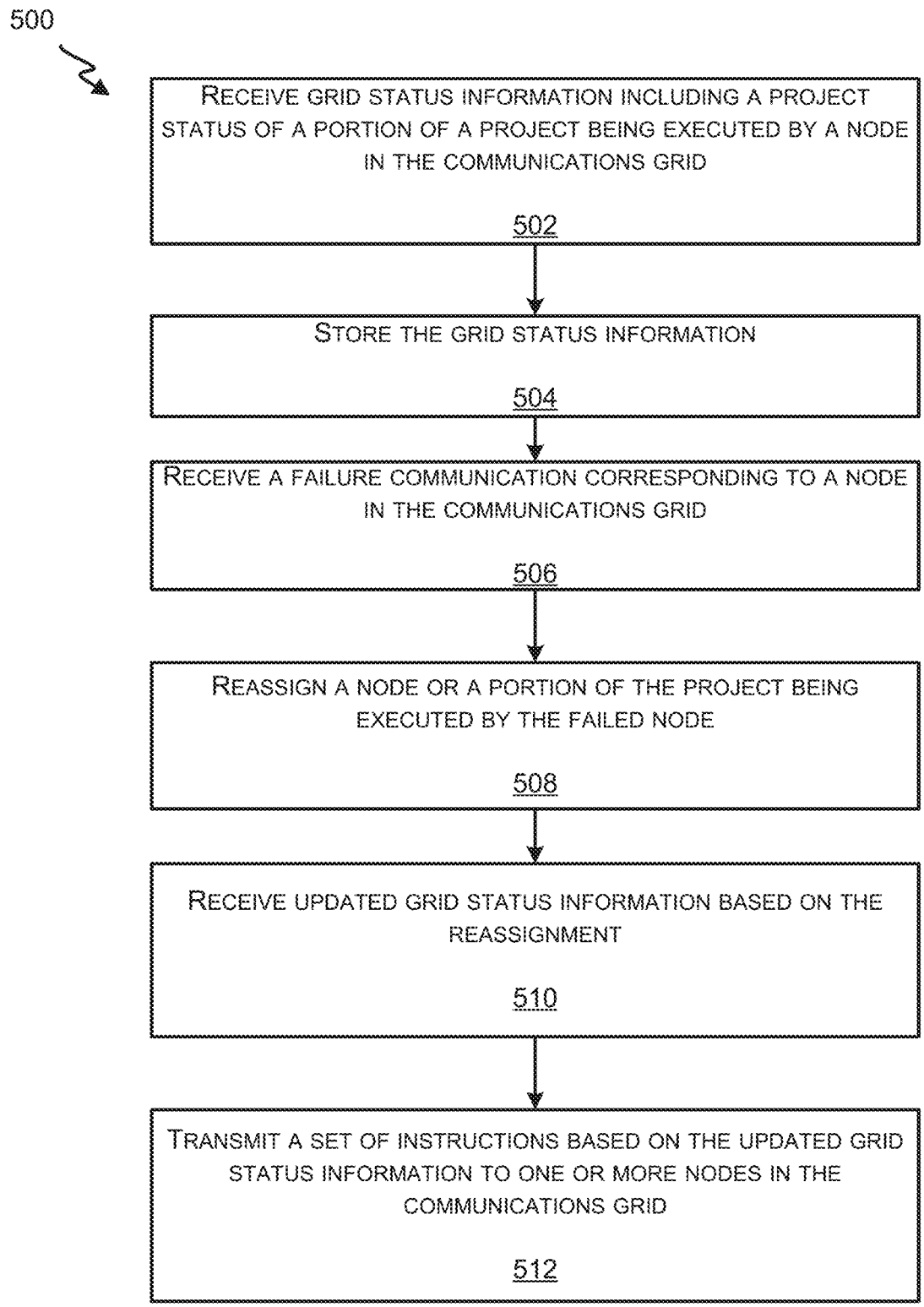
FIG. 5 illustrates a flow chart showing an example process for adjusting a communications grid or a work project in a communications grid after a failure of a node, according to at least one embodiment of the present technology.

FIG. 5 illustrates a flow chart showing an example process for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
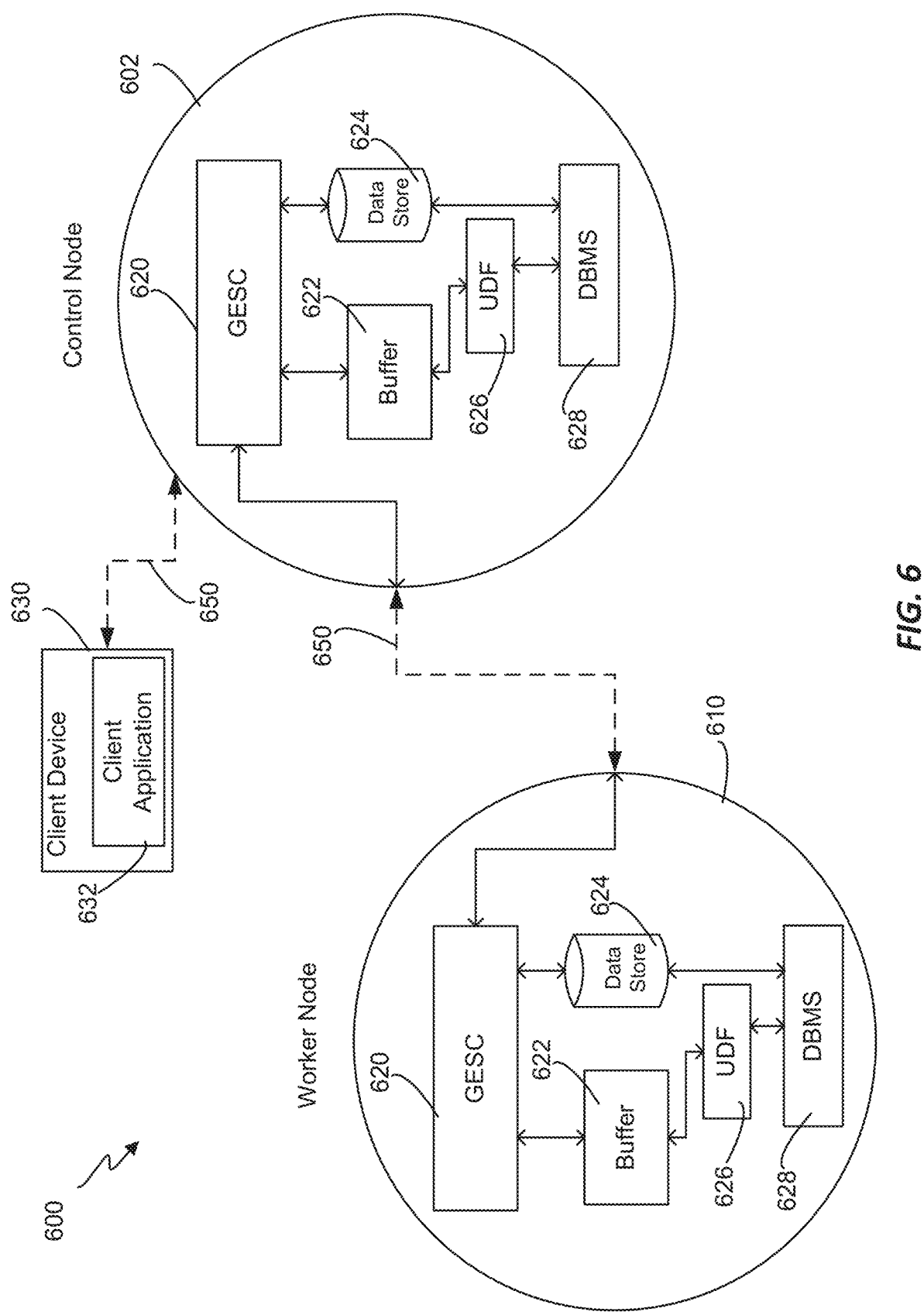
FIG. 6 illustrates a portion of a communications grid computing system including a control node and a worker node, according to at least one embodiment of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 include multi-core data processors. Each node 602 and 610 includes a grid-enabled software component (GESC) 620 that executes on the data processor associated with that node and interfaces with buffer memory 622 also associated with that node. Each node 602 and 610 includes a database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DMBS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DMBS 628 may control the creation, maintenance, and use of database or data structure (not shown) within a nodes 602 or 610. The database may organize data stored in data stores 624. The DMBS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
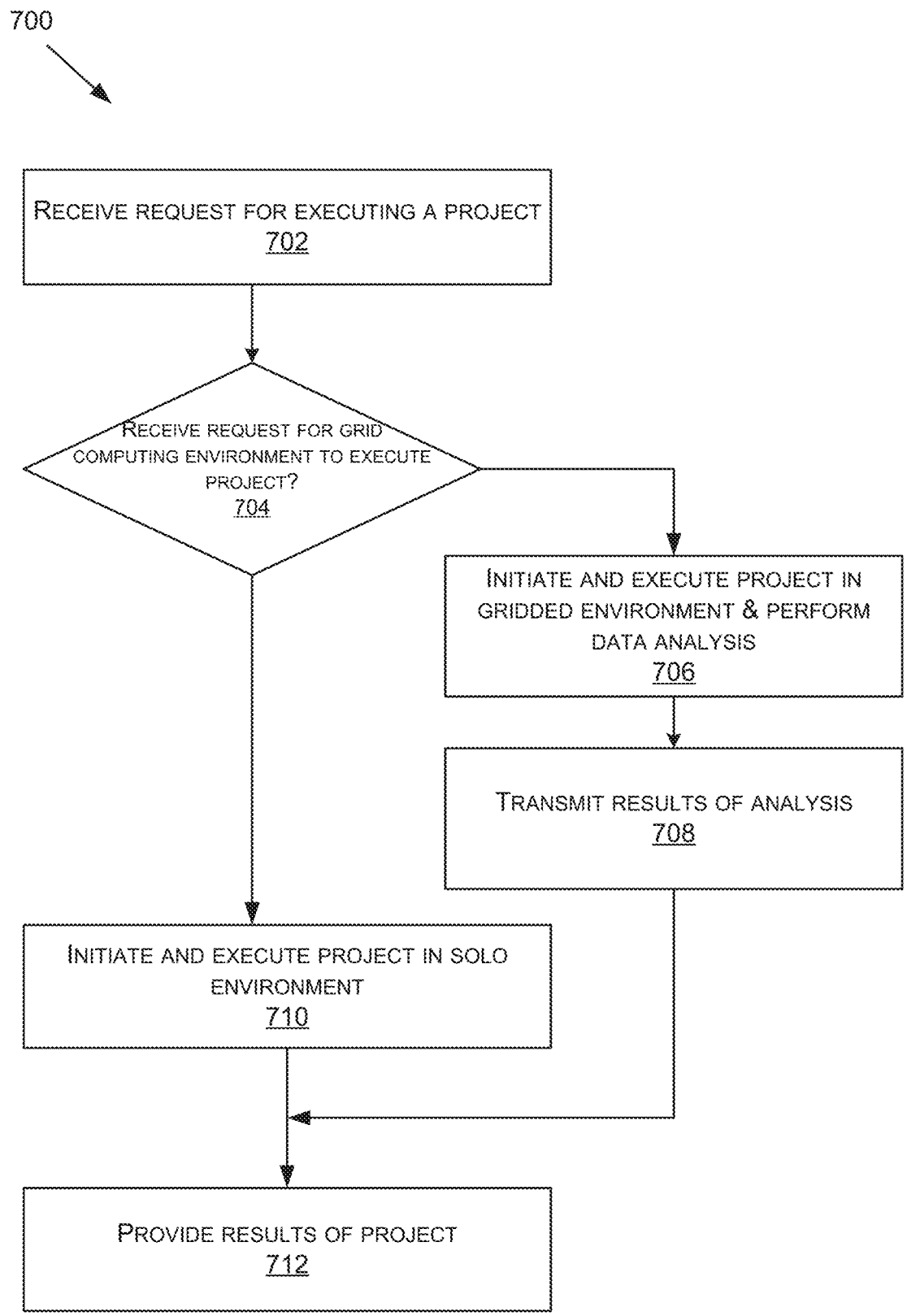
FIG. 7 illustrates a flow chart showing an example process for executing a data analysis or processing project, according to at least one embodiment of the present technology.

FIG. 7 illustrates a flow chart showing an example method for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project in operation 712.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024a-c, according to embodiments of the present technology. ESP system 1000 may include ESP device or subsystem 1001, event publishing device 1022, an event subscribing device A 1024a, an event subscribing device B 1024b, and an event subscribing device C 1024c. Input event streams are output to ESP device 1001 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024a, event subscribing device B 1024b, and event subscribing device C 1024c. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024a, event subscribing device B 1024b, and event subscribing device C 1024c, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024a, event subscribing device B 1024b, and event subscribing device C 1024c.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 1001 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024a using the publish/subscribe API. Subscribing client B 1006 may be started by an event subscription application B executing at event subscribing device B 1024b using the publish/subscribe API. Subscribing client C 1008 may be started by an event subscription application C executing at event subscribing device C 1024c using the publish/subscribe API.

An event block object containing one or more event objects is injected into a source window of the one or more source windows 806 from an instance of an event publishing application on event publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024a, event subscription device B 1024b, and event subscription device C 1024c. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024a-c. For example, subscribing client A 1004, subscribing client B 1006, and subscribing client C 1008 may send the received event block object to event subscription device A 1024a, event subscription device B 1024b, and event subscription device C 1024c, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
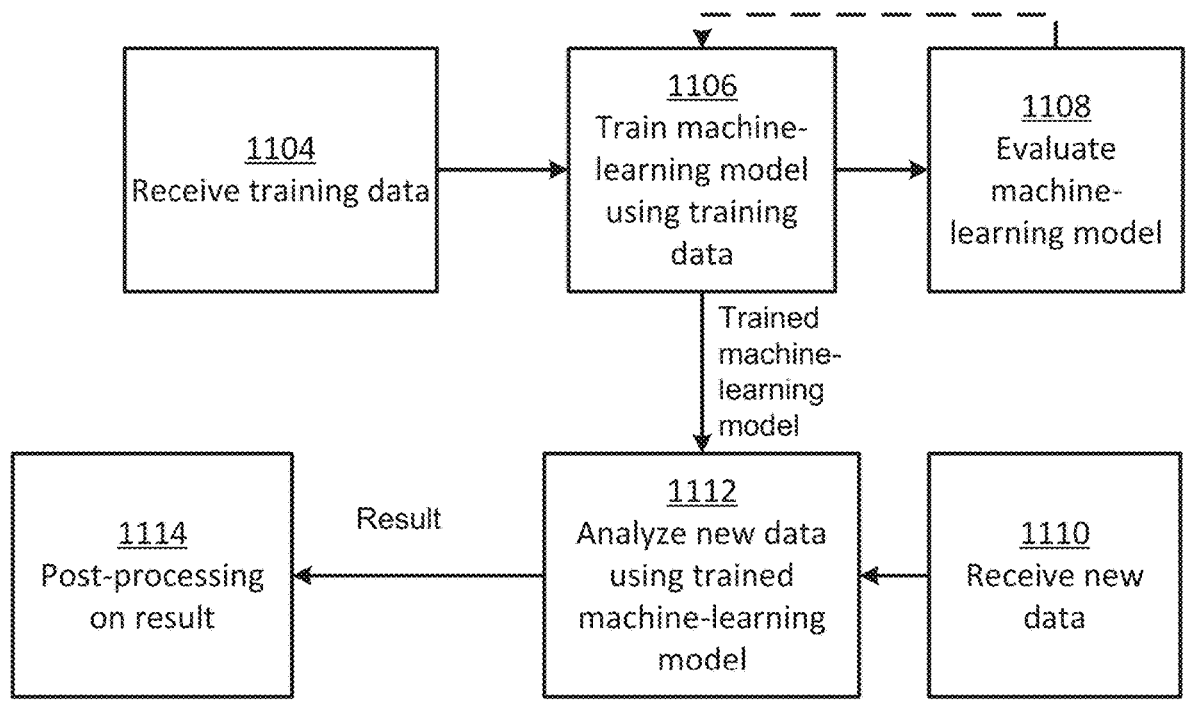
FIG. 11 illustrates a flow chart of an example of a process for generating and using a machine-learning model according to at least one embodiment of the present technology.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS) 6, SAS Viya 6 of all which are by SAS Institute Inc. of Cary, N.C.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1104, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1106, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1108, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 1106, where the machine-learning model can be further trained using additional training data or otherwise modified to improve accuracy. If the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
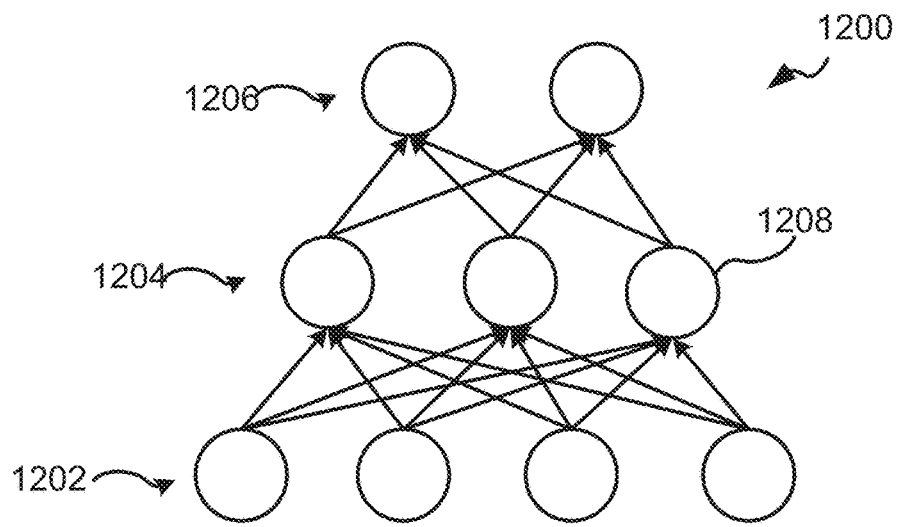
FIG. 12 illustrates an example of a machine-learning model as a neural network.

A more specific example of a machine-learning model is the neural network 1200 shown in FIG. 12. The neural network 1200 is represented as multiple layers of interconnected neurons, such as neuron 1208, that can exchange data between one another. The layers include an input layer 1202 for receiving input data, a hidden layer 1204, and an output layer 1206 for providing a result. The hidden layer 1204 is referred to as hidden because it may not be directly observable or have its input directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons and connections between the neurons can have numeric weights, which can be tuned during training. For example, training data can be provided to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 and a desired output of the neural network 1200. Based on the gradient, one or more numeric weights of the neural network 1200 can be updated to reduce the difference, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, every neuron only propagates an output value to a subsequent layer of the neural network 1200. For example, data may only move one direction (forward) from one neuron to the next neuron in a feed-forward neural network.

In other examples, the neural network 1200 is a recurrent neural network. A recurrent neural network can include one or more feedback loops, allowing data to propagate in both forward and backward through the neural network 1200. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer of the neural network 1200. Each subsequent layer of the neural network 1200 can repeat this process until the neural network 1200 outputs a final result at the output layer 1206. For example, the neural network 1200 can receive a vector of numbers as an input at the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the following equation:

$$y=\max(x,0)$$

where y is the output and x is an input value from the weighted vector. The transformed output can be supplied to a subsequent layer, such as the hidden layer 1204, of the neural network 1200. The subsequent layer of the neural network 1200 can receive the transformed output, multiply the transformed output by a matrix of numeric weights and a nonlinearity, and provide the result to yet another layer of the neural network 1200. This process continues until the neural network 1200 outputs a final result at the output layer 1206.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. Furthermore, these processors may also be employed in heterogeneous computing architectures with a number of and a variety of different types of cores, engines, nodes, and/or layers to achieve various energy efficiencies, processing speed improvements, data communication speed improvements, and/or data efficiency targets and improvements throughout various parts of the system when compared to a homogeneous computing architecture that employs CPUs for general purpose computing.

Figure 13A:
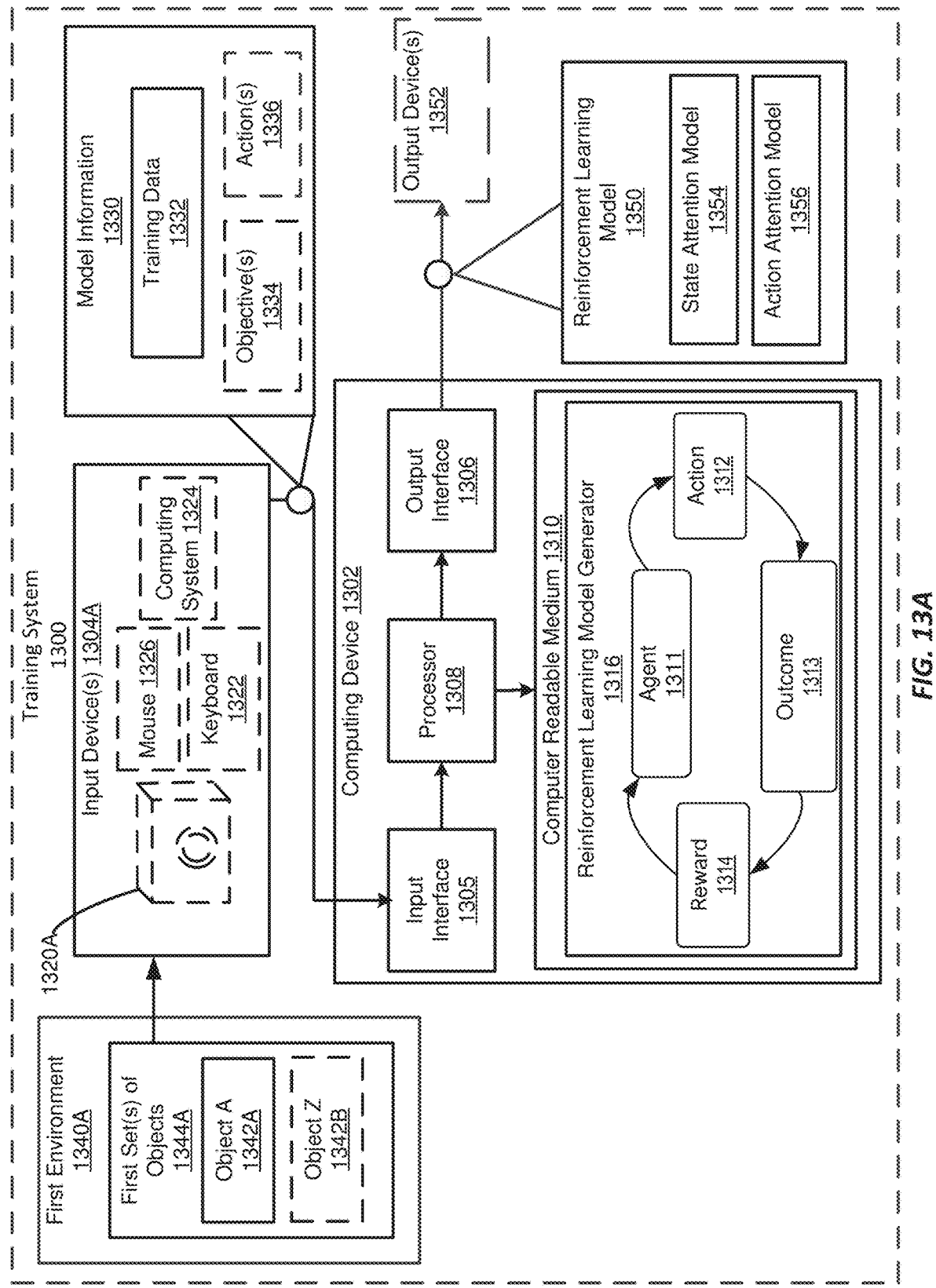
FIG. 13A illustrates an example block diagram of a training system in at least one embodiment of the present technology.

FIG. 13A illustrates an example block diagram of a training system 1300. For example, the training system may be useful for training a computer model to handle traffic control for a road intersection. Training system 1300 includes a computing device 1302. The training system 1300 is configured to exchange information between devices in the system (e.g., via wired and/or wireless transmission). For example, a network (not shown) can connect one or more devices of training system 1300 to one or more other devices of training system 1300.

For instance, in one or more embodiments, the training system 1300 includes one or more input devices 1304A for receiving information pertaining to a first environment 1340A via one or more input interfaces 1305 (e.g., for training the computing device 1302). For example, if the training system is training a system to handle traffic control, the first environment 1340A may be a traffic intersection and may comprise a first set of objects 1344A including one or more objects 1342 such as cars waiting or entering the intersection. For instance, the computing device 1302 may receive model information 1330 for building a model to represent the first environment 1340A or a subsequent environment. As an example, the computing system may receive training data 1332 for building a model. The training data 1332 may indicating multiple states of the first set of objects 1344A entering or waiting to enter the first environment 1340A. For instance, if the first environment is a physical environment, an input device such as a camera 1320A may capture information about the physical environment such as the number of lanes in an intersection, the allowed movements in the intersection, the number of cars waiting at the intersection. Alternatively, or alternatively, the environment may be a simulated environment or comprise additional simulated actions for a physical environment (e.g., a simulated traffic intersection) and a computing system component (e.g., computing device 1302 or computing system 1324) may generate information about the simulated environment. As another example, the first environment may be a virtual environment. For instance, the first environment may be implementing an assemble-to-order system with electronic files or documents that are assembled for electronic transmission. In this case, information may be input by a user pertaining to the electronic files or documents (e.g., using a mouse 1326 or keyboard 1322).

Additionally, the training system 1300 includes one or more output devices 1352 for outputting via one or more output interfaces 1306 information based on the first environment 1340A. For instance, the computing device 1302 can output a reinforcement learning model 1350 implementing a policy based on training data 1332 related to the first environment 1340A. For instance, in the context of a traffic intersection, the policy may relate to when to have a green light for a set of traffic lights (e.g., a green light for traffic lights for lanes 1 and 5 and a red light for all other traffic lights of the intersection). The policy may consider information about cars in the intersection like the number of waiting cars in a lane. In the context of a packet transfer environment, the policy may consider which packets to send considering information such as the packet's priority, size, arrival time, etc.

As an example, the reinforcement learning model 1350 can have two attention models. The first attention model is a state attention model 1354 introduced to handle a variable numbers of inputs (e.g., different numbers of roads or lanes in an intersection) and the second attention model is an action attention model 1356 for enabling decision-making with different numbers of actions (e.g., phases in an intersection, number of products in an assemble-to-order production system, number of waiting packets to send in a packet transferring problem). For example, the reinforcement learning model 1350 can handle different types of intersections (e.g., three or four approaching roads), different directionality (e.g., one-directional/bi-directional roads), different number of lanes (e.g., one, two, and three lanes roads), different number of phases, and different traffic flows.

In one or more embodiments, the computing device 1302 receives additional model information 1330 for training or implementing the reinforcement learning model 1350. For example, the computing device 1302 may receive action information 1336 such as a current action for the first environment 1340A (e.g., a current green light, a current product being assembled, a current packet being sent) or feedback from the first environment 1340A for acting according to a selected action for the first environment 1340A (e.g., the number of cars waiting after a selected lane shows a green light, the orders waiting to be assembled, the packets waiting to be sent). Alternatively, the computing device 1302 could simulate the first environment 1340A and generate the action information 1336 in the simulation.

As another example, the additional model information 1330 could comprise one or more objectives 1334 for the policy. An objective could be a single objective (e.g., to minimize the average travel time of all vehicles within a finite time frame). Alternatively, the objective may include multiple competing goals (e.g., to maximize throughput for packets, and prioritize packets of a certain type). The one or more objectives 1334 may be input into the computing device 1302 (e.g., using one or more input devices 1304A). Alternatively, or additionally, computing device 1302 may generate an objective (e.g., determine that certain traffic indicators are linked to better average travel times or throughput). The reinforcement learning model 1350 can use the model information 1330 to form a policy for controlling the first environment 1340A or a subsequent environment.

The computing device 1302 has a computer-readable medium 1310 and a processor 1308. Computer-readable medium 1310 is an electronic holding place or storage for information so the information can be accessed by processor 1308. Computer-readable medium 1310 can include, but is not limited to, any type of random access memory (RAM), any type of read only memory (ROM), any type of flash memory, etc. such as magnetic storage devices (e.g., hard disk, floppy disk, magnetic strips), optical disks (e.g., compact disc (CD), digital versatile disc (DVD)), smart cards, flash memory devices, etc.

Processor 1308 executes instructions (e.g., stored at the computer-readable medium 1310). The instructions can be carried out by a special purpose computer, logic circuits, or hardware circuits. In one or more embodiments, processor 1308 is implemented in hardware and/or firmware. Processor 1308 executes an instruction, meaning it performs or controls the operations called for by that instruction. The term "execution" is the process of running an application or the carrying out of the operation called for by an instruction. The instructions can be written using one or more programming language, scripting language, assembly language, etc. Processor 1308 in one or more embodiments can retrieve a set of instructions from a permanent memory device and copy the instructions in an executable form to a temporary memory device that is generally some form of RAM, for example. Processor 1308 operably couples with components of computing device 1302 (e.g., input interface 1305, with output interface 1306 and with computer-readable medium 1310) to receive, to send, and to process information.

In one or more embodiments, computer-readable medium 1310 stores instructions for execution by processor 1308. For example, in one or more embodiments, the computer-readable medium 1310 comprises instructions for a reinforcement learning model generator 1316. The basic reinforcement learning model algorithm is used to train an agent which observes an environment and uses feedback from the environment (e.g., a reward for doing well at a particular time t) to learn the best action to take in the environment.

In the example in FIG. 13, the reinforcement learning model generator 1316 may generate the reinforcement learning model 1350 using a computing agent 1311 to consider a state at time t (e.g., traffic characteristics for lanes in an intersection) and suggest an action 1312. For instance, at each time step t the next action for the first environment 1340A could be an active phase like a green light at time t+1. Following the action 1312 there is an outcome 1313 (e.g., a change in the traffic characteristics for lanes in an intersection). The computing device 1302 can determine a reward 1314 based on the outcome 1313 considering the one or more objectives 1334. For instance, the objective may be one to minimize traffic pressure at an intersection. Traffic pressure may be considered a measure of traffic waiting behind a signal (e.g., an absolute value of the total number of waiting vehicles in entering lanes minus the total number of leaving vehicles in leaving lanes). If the objective is to minimize traffic pressure, the reward can be the negative of a traffic pressure measurement. This process can continue iteratively until a policy is generated for the reinforcement learning model 1350. For example, the computing device 1302 can determine over time multiple rewards from feedback for acting according to each selection for the multiple states corresponding to each time step of an episode for the training data 1332. The computing device 1302 can train the reinforcement learning model 1350 to maximize the multiple rewards over time (e.g., using a policy gradient reinforcement learning algorithm to maximize a discounted sum of rewards). Examples of reinforcement learning model embodiments are described with respect to example embodiments herein.

In one or more embodiments, one or more applications stored on computer-readable medium 1310 are implemented in software (e.g., computer-readable and/or computer-executable instructions) stored in computer-readable medium 1310 and accessible by processor 1308 for execution of the instructions. The one or more applications can be integrated with other analytic tools such as that offered by SAS Institute Inc. of Cary, N.C., USA. Merely for illustration, the applications are implemented using or integrated with one or more SAS software tools such as JMP®, Base SAS, SAS® Enterprise Miner™, SAS/STAT®, SAS® High Performance Analytics Server, SAS® Visual Data Mining and Machine Learning, SAS® LASR™ SAS® In-Database Products, SAS® Scalable Performance Data Engine, SAS® Cloud Analytic Services, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, and SAS/IML® all of which are developed and provided by SAS Institute Inc. of Cary, N.C., USA.

In one or more embodiments, fewer, different, and additional components can be incorporated into computing device 1302 or a system comprising computing device 1302. For instance, in one or more embodiments, there are multiple input devices 1304. In the same or different embodiments, there are multiple output devices 1352. As another example, the same interface supports both input interface 1305 and output interface 1306. For example, a touch screen provides a mechanism for user input and for presentation of output to the user. Alternatively, the input interface 1305 has more than one input interface that uses the same or different interface technology. Alternatively, or additionally, the output interface 1306 has more than one output interface that uses the same or different interface technology. In one or more embodiments, the functionality of the one or more input devices 1304 or one or more output devices 1352 are integrated into computing device 1302.

Figure 13B:
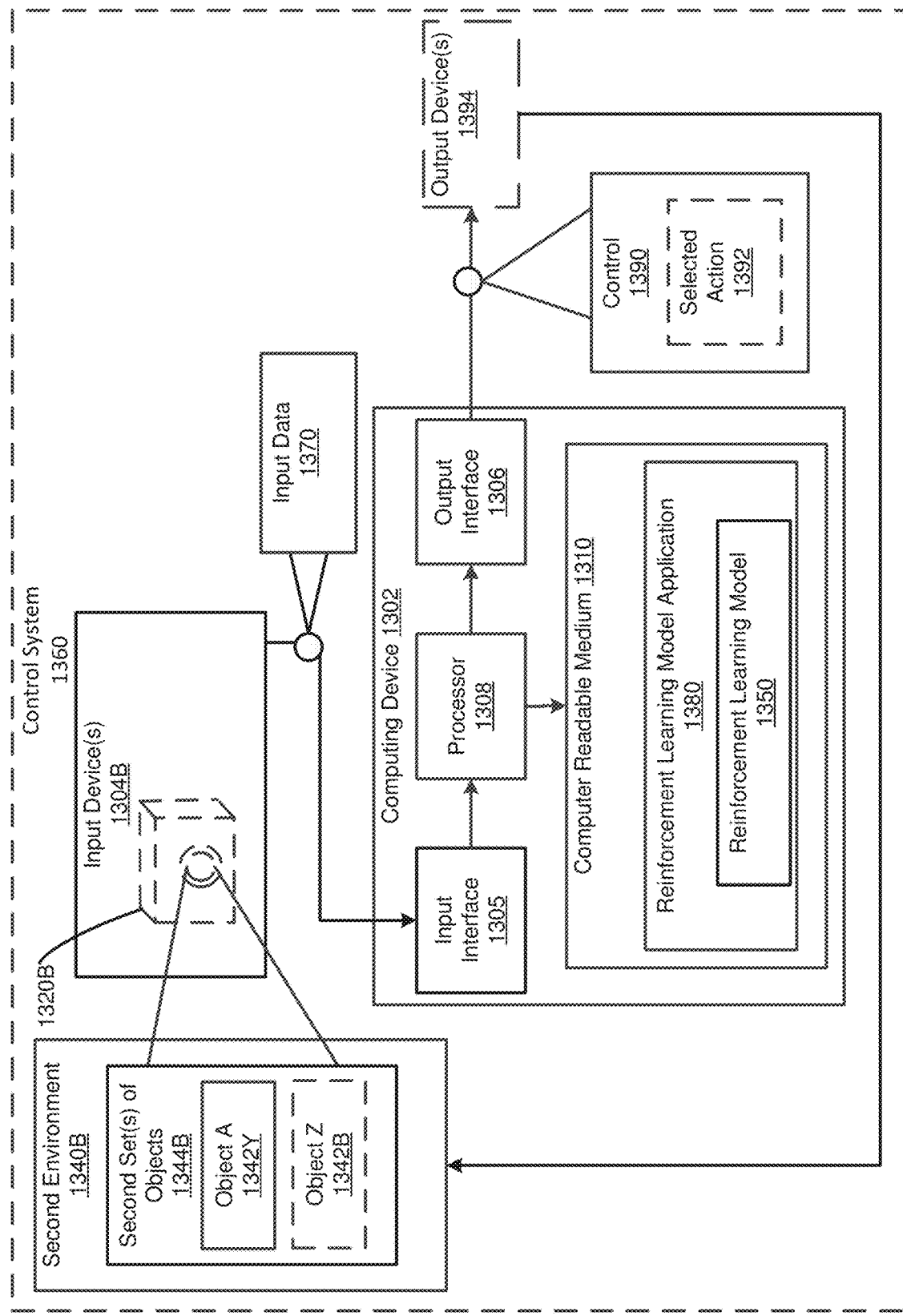
FIG. 13B illustrates an example block diagram of a control system in at least one embodiment of the present technology.

A reinforcement learning model 1350 can be used by a control system to control another environment. FIG. 13B illustrates an example block diagram of a control system 1360 for controlling a second environment 1340B. For simplicity, one or more examples herein are described with reference to an example where the first environment 1340A and the second environment 1340B are different traffic intersections. Embodiments herein provide a framework for learning a general traffic control policy according to training system 1300 that can be deployed in an intersection of interest and ease the traffic flow. Embodiments herein do not require training for each new intersection with a different structure or traffic flow distribution. Rather a single, universal model for intersections with different number of roads, lanes, phases (possible signals), and traffic flow can be created. One of ordinary skill in the art will appreciate that techniques are applicable to different types of environments than described explicitly herein (e.g., if the reinforcement learning model is trained on a resource allocation problem, a dynamic matching problem, assemble-to-order systems, etc.).

The control system 1360 is configured to exchange information between devices in the control system 1360 (e.g., via wired and/or wireless transmission). For example, a network (not shown) can connect one or more devices of control system 1360 to one or more other devices of control system 1360. Alternatively, or additionally, the control system 1360 is integrated into one device (e.g., the computing device 1302 may be at the intersection and comprise equipment to capture information pertaining to the second environment 1340B and control the second environment 1340B). In this example, the control system 1360 comprises the computing device 1302 of FIG. 13A. In other examples, the control system 1360 comprises a different computing device. For example, a computing device for the training system 1300 may be in the first environment 1340A and another computing device for the control system 1360 may be in the second environment 1340B. For instance, the computing device 1302 could instead be an output device 1352 or receive a reinforcement learning model from output device 1352. Regardless the computing device 1302 has access to a reinforcement learning model comprising multiple different attention computer model components. In this example, computer-readable medium 1310 has reinforcement learning model 1350 trained on training data 1332 of the first environment 1340A.

In one or more embodiments, the control system 1360 includes one or more input devices 1304B for receiving information pertaining to a second environment 1340B via one or more input interfaces 1305 (e.g., for controlling the second environment 1340B). The second environment 1340B may be another traffic intersection and may comprise a second set of objects 1344B including one or more objects 1342 such as cars waiting or entering the intersection. For instance, the computing device 1302 may receive input data 1370. The input data may indicate a first state of the second set of objects 1344B entering or waiting to enter the second environment 1340B. For instance, if the second environment is a physical environment, an input device such as a camera 1320B may capture information about the physical environment such as the number of lanes in the intersection. Alternatively, the environment may be a simulated environment or virtual environment as described with respect to FIG. 13A.

In one or more embodiments, the control system 1360 includes one or more output devices 1394 for outputting via one or more output interfaces 1306 information based on the second environment 1340B. For instance, the information may comprise control information 1390 for controlling the second environment 1340B (e.g., for controlling a traffic light signal in the second environment 1340B). For example, the control information 1390 may comprise a selection of an action 1392 to implement in the second environment (e.g., changing a current traffic light signal from green to yellow/orange/amber or red and changing at least one traffic light signal of a second lane to green). In one or more embodiments, the computing device has a computer-readable medium 1310 and a processor 1308 for generating a selected action. For example, in one or more embodiments, the computer-readable medium 1310 comprises instructions for a reinforcement learning model application 1380. For instance, the reinforcement learning model application 1380 may determine a set of multiple candidate actions for the second set of objects 1342 (e.g., possible movements through the intersection), and generate an indication of a selected action of the set of multiple candidate actions for the input data 1370 according to the reinforcement learning model 1350. In one or more embodiments, the reinforcement learning model application 1380 comprises the reinforcement learning model generator 1316 or can update a reinforcement learning model.

Figure 14A:
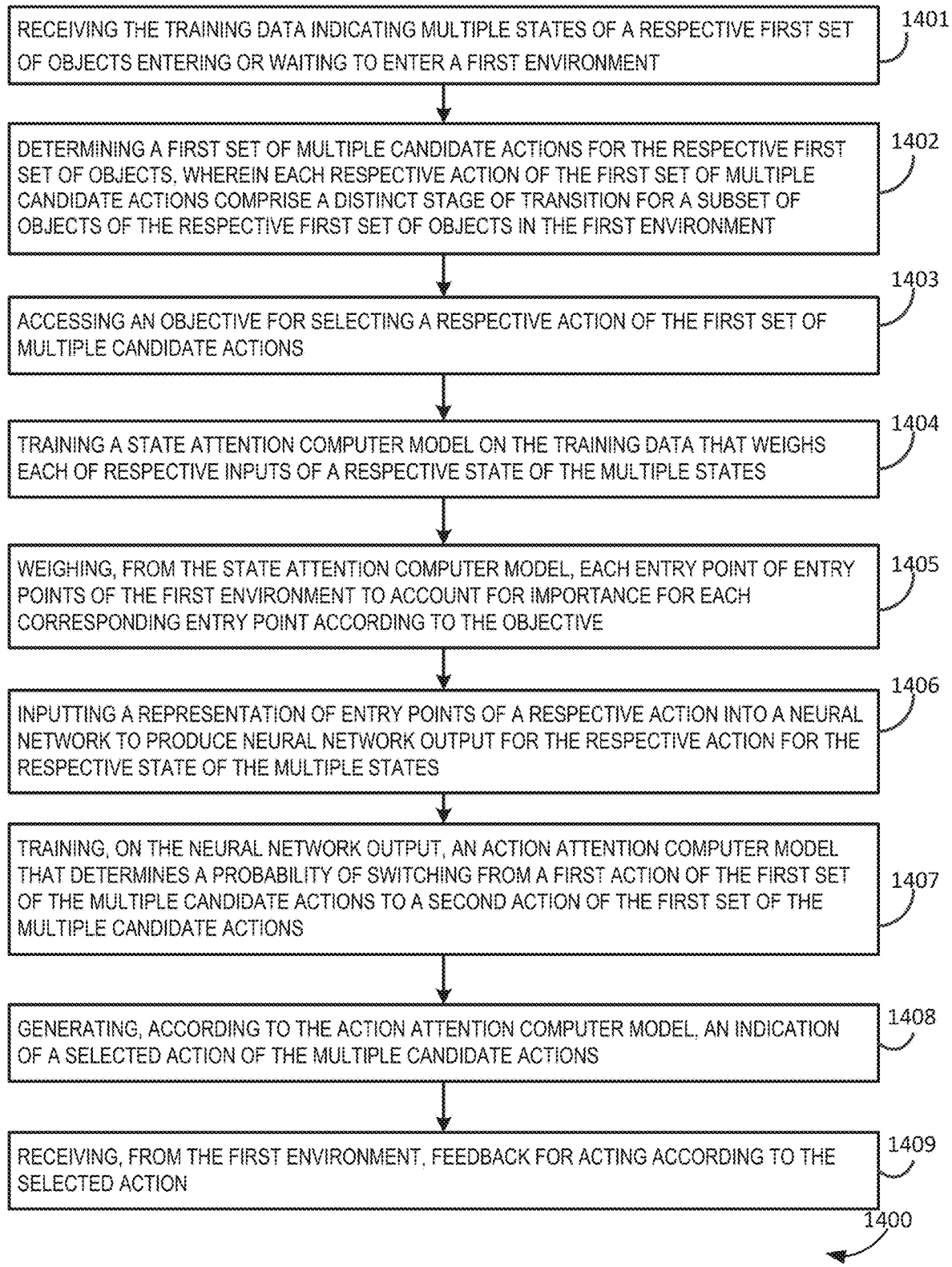
FIG. 14A illustrates an example flow diagram for obtaining a reinforcement learning model in at least one embodiment of the present technology.
Figure 14B:
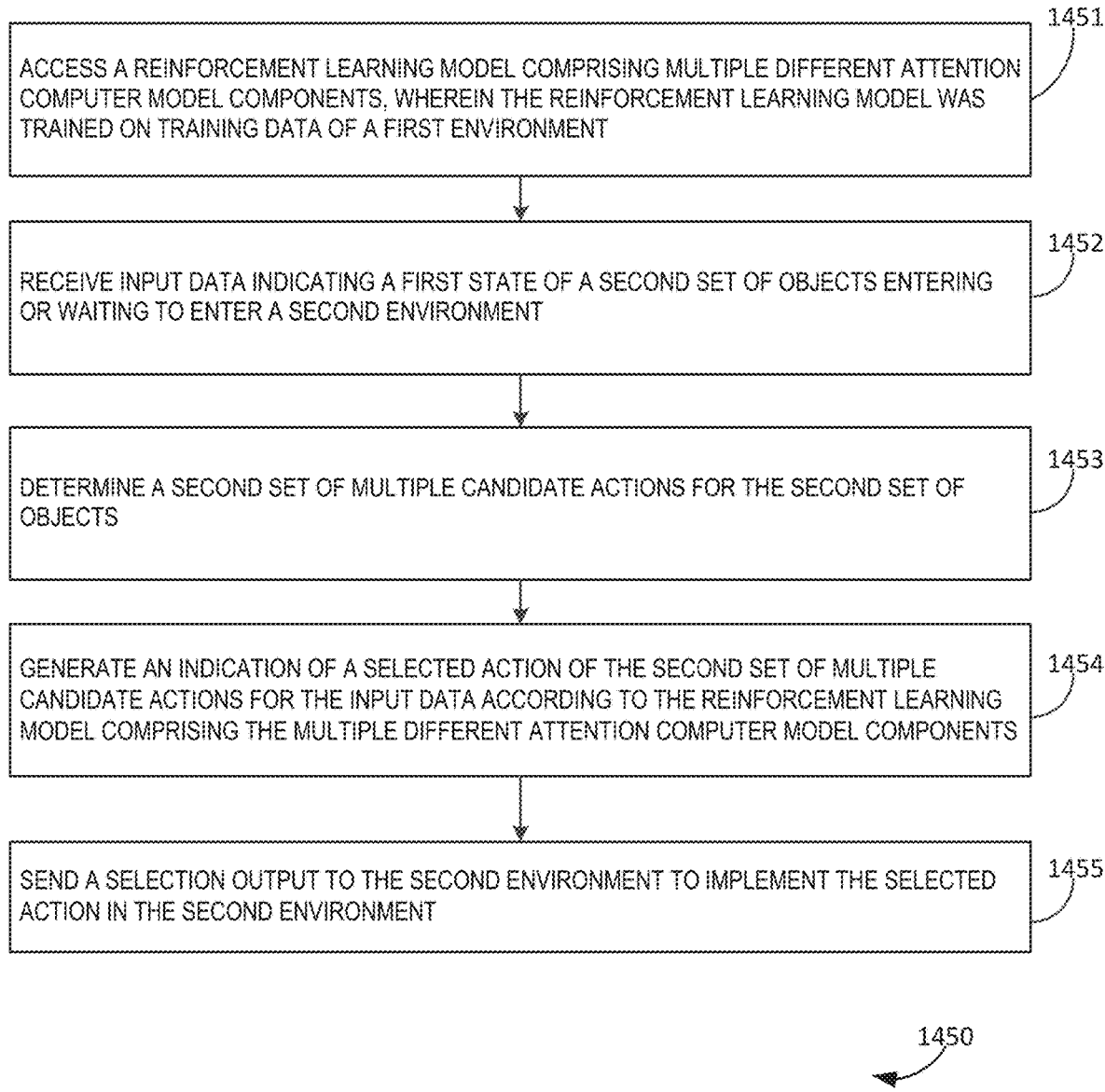
FIG. 14B illustrates an example flow diagram for sending a control in at least one embodiment of the present technology.

In one or more embodiments, a computing system (e.g., a computing device 1302, the training system 1300 and/or the control system 1360) implements a method as described herein (e.g., a method shown in FIG. 14A or 14B). For example, the computing system may be a part of an Internet of Things (IoT) system that has devices with sensors for observing an environment (e.g., an intersection) and for exchanging data with other devices or systems over the internet (e.g., feedback from the environment). For instance, traffic indicators could be observed by sensors on a traffic light or on a connected car, and these sensors could send data to a training system for training a model or a control system for controlling an intersection.

FIG. 14A illustrates an example flow diagram of a method 1400 for obtaining a reinforcement learning model (e.g., reinforcement learning model 1350). The method 1400 comprises an operation 1401 for receiving the training data (e.g., training data 1332) indicating multiple states of a respective first set of objects entering or waiting to enter a first environment. For instance, the computing system can receive for a respective state a current action for the first environment and one or more attributes for objects waiting or entering the first environment. In an example in which the first environment is a traffic intersection, the computing system may receive information on current traffic lights (e.g., which traffic lights are green or red) and may receive information on the number of cars waiting in each lane. In another example in which the first environment is a assemble-to-order production line, the computing system may receive information on the orders waiting to be assembled (e.g., the current order being assembled, its due date, required processing time, the components it has) and may receive information on the number of waiting orders, the components and parts that they need, and due dates of each.

The method 1400 comprises an operation 1402 for determining a first set of multiple candidate actions for the respective first set of objects. Each respective action of the first set of multiple candidate actions comprises a distinct stage of transition for a subset of objects of the respective first set of objects in the first environment. For example, different possible movements or phases within a traffic intersection.

The method 1400 comprises an operation 1403 for accessing an objective (e.g., one or more objectives 1334) for selecting a respective action of the first set of multiple candidate actions.

The method 1400 comprises an operation 1404 for training a state attention computer model (e.g., state attention model 1354) on the training data that weighs each of respective inputs of a respective state of the multiple states. The objective could be, for instance, a user-defined objective for movement of objects in the first environment (e.g., minimizing an average travel time or wait time at intersections, minimize the tardiness of orders in a make-to-assemble system, minimize the sum of waiting time for packets in a packet-transfer system).

The method 1400 comprises an operation 1405 for weighing, from the state attention computer model, each entry point of entry points of the first environment to account for importance for each corresponding entry point according to the objective. For example, if the entry point to the first environment is a lane of a traffic intersection, an importance may be the importance for a particular lane to have a green light.

The method 1400 comprises an operation 1406 for inputting a representation of entry points of a respective action into a neural network to produce neural network output for the respective action for the respective state of the multiple states.

The method 1400 comprises an operation 1407 for training, on the neural network output, an action attention computer model (e.g., action attention model 1356) that determines a probability of switching from a first action of the first set of the multiple candidate actions to a second action of the first set of the multiple candidate actions.

The method 1400 comprises an operation 1408 for generating, according to the action attention computer model, an indication of a selected action of the multiple candidate actions. For example, a selected light to turn green in a traffic signal control problem, and the order to assemble next in an assemble-to-order system.

The method 1400 comprises an operation 1409 for receiving, from the first environment, feedback for acting according to the selected action. For example, the feedback may be the number of cars waiting on the other lanes at the completion of a period of time that the light is green.

In one or more embodiments, a reinforcement learning model can be implemented by a control system (e.g., control system 1360 for controlling an environment). FIG. 14B illustrates an example flow diagram of a method 1450 for sending a control. The method 1400 comprises an operation 1451 for accessing a reinforcement learning model comprising multiple different attention computer model components. The reinforcement learning model was trained on training data of a first environment. For instance, the operation 1451 comprises accessing a reinforcement learning model obtained according to the method 1400 in FIG. 14A.

As an example, the reinforcement learning model may be trained on training data of a single environment that comprises a given number of entry points into the first environment for the respective first set of objects. The reinforcement learning model may comprise a single model applicable for multiple different environments. One or more of the multiple different environments may be different than the environment that the model was trained on (e.g., a second environment may comprise a different number of entry points). However, the reinforcement learning model can still be used to make decision for a second environment even if it is different than the environment for training. Alternatively, or additionally, the reinforcement model may be trained on multiple different environments, that may or may not include one or more features of the second environment.

The method 1400 comprises an operation 1452 for receiving input data indicating a first state of a second set of objects entering or waiting to enter a second environment. The reinforcement learning model can be applied to a different environment which may have different possible candidate actions (e.g., the model was trained on a 3-way intersection and then applied to a 4 way-intersection). The method 1400 comprises an operation 1453 for determining a second set of multiple candidate actions for the second set of objects.

The method 1400 comprises an operation 1454 for generating an indication of a selected action of the second set of multiple candidate actions for the input data according to the reinforcement learning model comprising the multiple different attention computer model components. For example, the selected action could include turning a traffic signal light green.

The method 1400 comprises an operation 1455 for sending a selection output to the second environment to implement the selected action in the second environment.

Figure 15A:
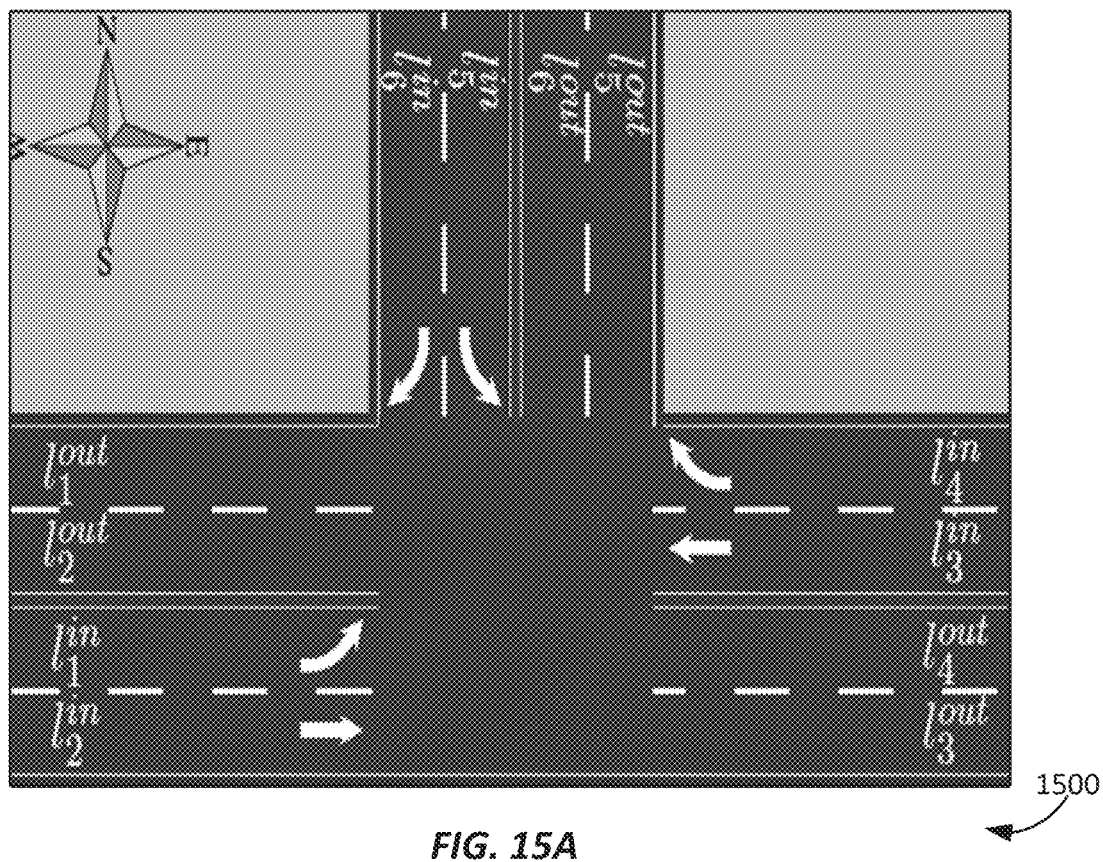
FIG. 15A illustrates an example first environment in at least one embodiment of the present technology.

Embodiments are applicable to an end-to-end Reinforcement Learning (RL) algorithm for traffic signal control but also to other environments. FIG. 15A illustrates an example environment that is an intersection 1500. An intersection can be considered a junction of one or more roads (e.g., 3-way, 4-way or 5-way intersections). Each road might have one or two direction(s) and each direction includes one lane or more. Lanes with arrows indicating entering the intersection may be considered entry points of this environment. The set of the traffic movements which are valid during a green light may be called a phase. An intersection has at least two phases, and they may have some shared traffic movement(s).

Figure 15B:
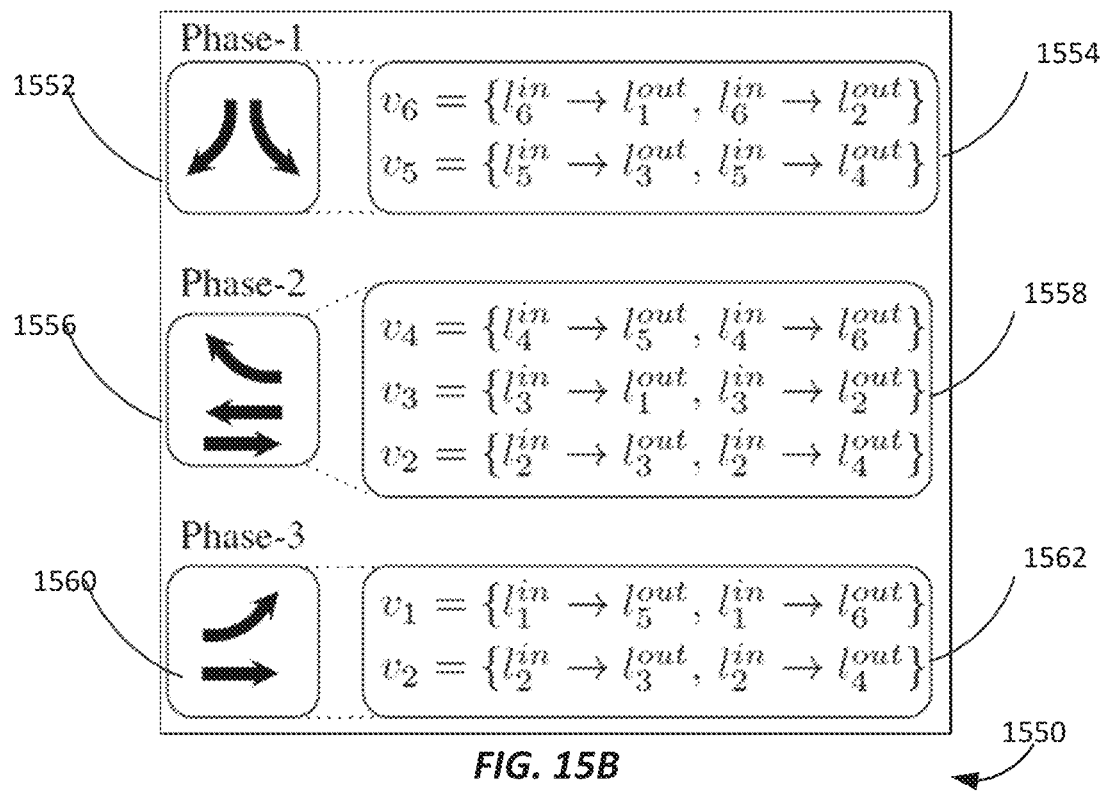
FIG. 15B illustrates example candidate phases of a first environment in at least one embodiment of the present technology.

In the example in FIG. 15A, traffic control is used to control 6 lanes entering the intersection 1500 and 6 lanes exiting the intersection 1500 for a 3-way intersection. FIG. 15B shows candidate actions 1550 for a given vehicle approaching the intersection 1500. There is a finite number of ways that the cars can transition from the entering lanes to leaving lanes. A traffic movement $\upsilon_1$ for a phase is defined as a set that maps the entering traffic of lane $l \in L^{in}$ to possible leaving lanes $l' \in L^{out}$. Each phase runs for a given minimum amount of time and after that, a decision about the next phase should be taken.

In this 3-way intersection example, the six lanes entering the intersection 1500 are labeled with $l_k^{in}$ and the six leaving lanes are labeled with $l_k^{out}$, where $k \in \{1, \ldots, 6\}$. There are six traffic movements denoted by $\upsilon_1, \ldots, \upsilon_6$ and three possible phases—phase 1552, phase 1556, and phase 1560 of FIG. 15B.

As an example, a traffic light could take a first action and allow phase 1552 for the intersection 1500. Phase 1552 describes possible allowed transitions for vehicles entering lanes $l_5^{in}$ or $l_6^{in}$ in intersection 1500. A set 1554 describes possible results of an action taken according to phase 1552 (e.g., a vehicle enters in lane $l_6^{in}$ and exits on lane $l_1^{out}$ of intersection 1500). Phase 1552 involves two traffic movements $\upsilon_6 = \{l_6^{in} \to l_1^{out}, l_6^{in} \to l_2^{out}\}$ and $\upsilon_5 = \{l_2^{in} \to l_3^{out}, l_5^{in} \to l_4^{out}\}$, hence the set of participating lanes associated with this phase is $L_1 = \{l_5^{in}, l_6^{in}, l_1^{out}, l_2^{out}, l_3^{out}, l_4^{out}\}$. During phase 1552 all other inputs lanes could see, for instance, a red light indicating not to enter the intersection. Alternatively, a traffic light could authorize a phase 1556, which would allow cars in lane $l_4^{in}$ to turn right while lanes $l_3^{in}$ and $l_2^{in}$ go straight through the intersection 1500. The set 1558 describes possible results of that action. For instance, if a car enters on lane $l_4^{in}$ and turns right it will go out on lanes $l_5^{out}$ or $l_6^{out}$. As yet another option, a traffic light could authorize phase 1560 which would allow lane $l_1^{in}$ to turn left while lane $l_2^{in}$ can cross straight through the intersection 1500. The set 1562 describes possible results of that action.

The number of traffic movements as well as the number of participating lanes are not necessarily the same for different phases. For example, in FIG. 15B, phase 1552 and phase 1560 involve two traffic movements, while there are three traffic movements for phase 1556. Further, phase 1552 and phase 1560 involve six participating lanes while phase 1556 includes nine lanes. This results in different size(s) of the input/output of the model among different intersection instances. Therefore, building a universal model that handles such complexity is not straightforward, even using conventional reinforcement learning algorithms.

Approaches for controlling signalized intersections could be categorized into two main classes, namely conventional methods and adaptive methods. In the former, customarily rule-based fixed cycles and phase times are determined a priori and offline based on historical measurements as well as some assumptions about the underlying problem structure. However, because traffic behavior is dynamically changing, that makes most conventional methods highly inefficient. In adaptive methods, decisions are made based on the current state of the intersection. Self-organizing Traffic Light Control (SOTL) and Max-pressure are among the most popular adaptive methods that consider the number of approaching vehicles to the intersection in their traffic control algorithm. These methods are short-sighted because they do not consider the long-term effects of the decisions on the traffic. Besides, these methods do not use the feedback from previous actions toward making more efficient decisions. In response, more sophisticated algorithms have been proposed using artificial intelligence (AI) for controlling traffic signals. These systems are still limited in that they need to be re-designed and re-trained from scratch whenever it faces a different intersection either with different topology or traffic distribution. Learning specialized policies for each individual intersection can be problematic, as not only do reinforcement learning agents have to store a distinct policy for each intersection, but in practice data collection resources and preparation impose costs. These costs include the burden on human-experts' time to setup a new model, and computational resources to train and tune a new model. Thus, this cumbersome procedure may be infeasible for a city with thousands of distinct intersections.

Embodiments herein provide a reinforcement learning algorithm that can train a universal model which is a flexible model that can work for different intersections, with different number of roads, lanes, phase(s), traffic distribution, and type of sensory data to measure the traffic. In other words, once the model is trained under a comprehensive set of phases, roads, lanes, and traffic distribution, the trained model can be used for a new unseen or newly designed intersection. Embodiments can extract an abstract representation of the intersection status, without extra redefinition, and reuse this information for fast deployment.

Figure 16A:
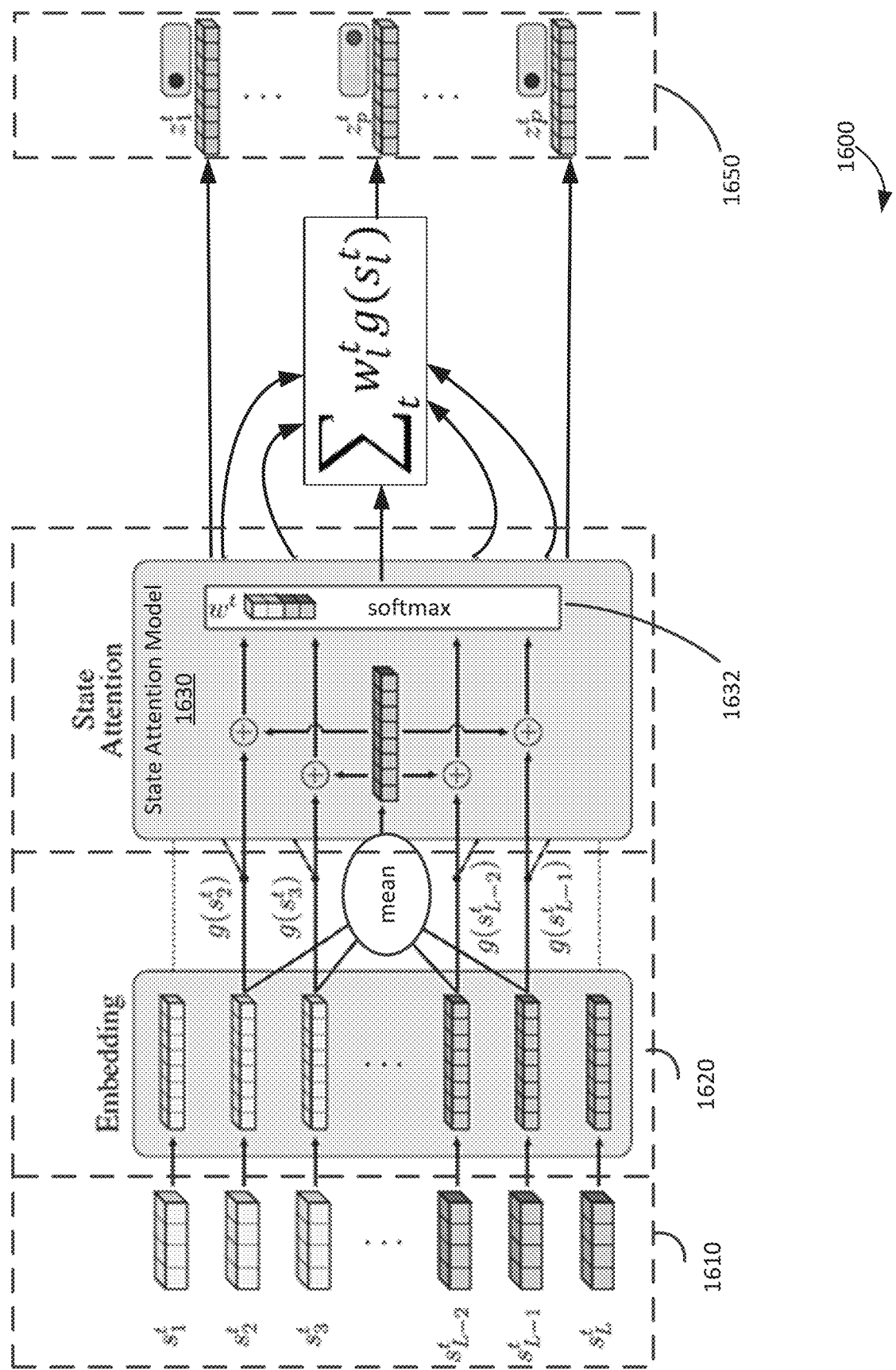
FIGS. 16A-B illustrate an example reinforcement learning model in at least one embodiment of the present technology.
Figure 16B:
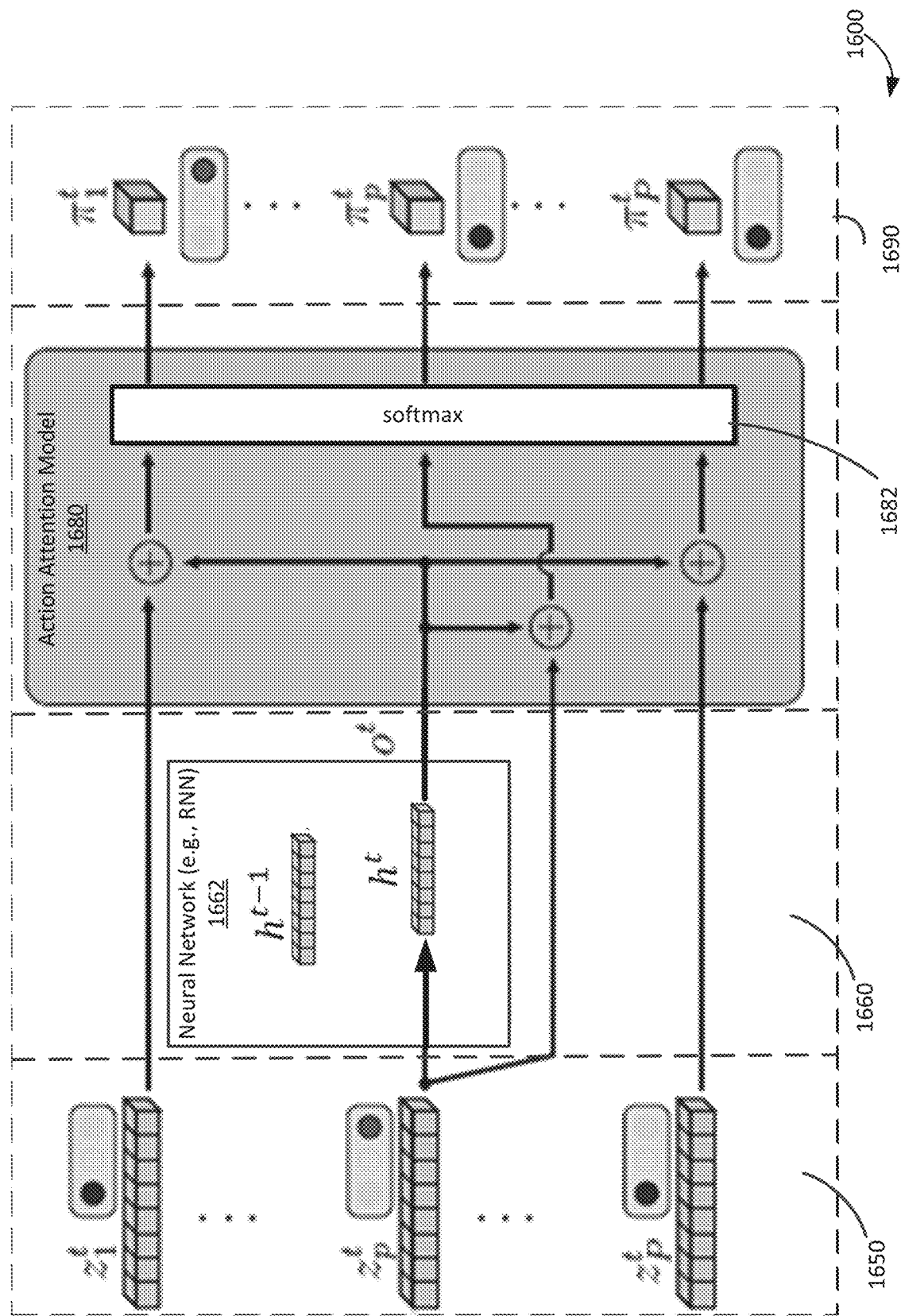

FIGS. 16A-16B together illustrate an example reinforcement learning model 1600 for reinforcement learning model 1350 in FIGS. 13A and 13B (e.g., one that can be used for different intersections). As shown in FIG. 16B, the reinforcement learning model 1600 produces a policy π in stage 1690, which for a given state $s^t$ of an environment entered in stage 1610 on FIG. 16A (e.g., an intersection) suggests the action (p) for the next time-step to optimize the long-term cumulative rewards. For instance, at each time step t, an action can be the active phase at time t+1. In the context of a traffic intersection, the reinforcement learning model 1600 can be a unified model that fits or approximates every intersection configuration.

In this example, the reinforcement learning model receives in a first stage 1610, a first set of inputs (s) in the training data pertaining to a first state of the respective first set of objects. For example, if the environment is one related to an intersection, $s_l^t$ can be defined as the traffic characteristics of lane l∈L at time t, where L denotes the set of all approaching (i.e., either entering or leaving) lanes to the intersection. In traffic signal control, different traffic characteristics for each lane can be considered as input describing the objects in the environment, e.g., queue length, waiting time, delay, the number of moving vehicles, etc. Any of these characteristics can be assigned to $s_l^t$ (e.g., they can be user-defined characteristics). In the reinforcement learning context, the state at time t is the traffic characteristics $s_l^t$ for all lanes l∈L, i.e., $s^t = \{s_l^t, l∈L\}$.

The reinforcement learning model 1600 constructs meaningful action representations (e.g., phases for a traffic intersection). The phase representations can be extracted from the traffic characteristic of the participating lanes $\{s_l^t, l∈L_p\}$. For example, the number of cars in participating lanes can be utilized for a computing system to infer how congested the traffic movements are, how close the cars are with respect to the intersection, and whether activating a phase will ease the traffic.

In one or more embodiments, to allow more capacity in feature extraction, the reinforcement learning model 1600 embeds $s_l^t$ into a higher dimensional space in an optional stage 1620. In this example, a single Conv1D transformation for a convolutional neural network is used as an embedding function g, but other computing systems may use other embedding functions (e.g., more intricate embedding functions).

The reinforcement learning model 1600 has two major responsibilities: i) extract meaningful action representations $z_p^t$ for every action p (e.g., phase) in a stage 1650, and ii) decide on the next active action in a stage 1690. To add universality to these responsibilities, the input and output dimension of the model can be independent of the environment (e.g., the intersection configuration). The reinforcement learning model 1600 uses two attention model components: state attention model 1630 and action attention model 1680 for handling the phase representation from the raw-state and for choosing the next phase, respectively.

An attention mechanism is used to learn the importance of each element in a problem with variable number of inputs. Generically, an attention mechanism takes two types of inputs to attention, namely a set of references $\{r_i\}$ and a query q. The attention computes an alignment $a:=\{a_i\}$, where $$a_i = u_a \tan h(U_r \bar{r}_i + U_q \bar{q}),$$

in which $\bar{q}$ and $\bar{r}_i$ are trainable linear mappings of q and $r_i$, respectively; and $U_q$, $U_r$, $u_a$ are trainable variables. The alignment a has the same size as the input reference set $\{r_i\}$. Finally, the attention returns w, which is a probability distribution computed as softmax(a) (e.g., softmax 1632 and softmax 1682).

In this example, the state attention model 1630 uses embeddings and returns the importance weights $w_p^t := \{w_l^t, l∈L_p\}$ for attending on $g(s_l^t)$ of each participating lane in phase p, i.e., where $$w_p^t = \text{state-attention}(r_p^t, q_p^t), \forall p∈P,$$

where the references $r_p^t$ are the embedded participating lane characteristics, and the query $q_p^t$ is defined to be their average, i.e., $$r_p^t := \{g(s_l^t), \, l \in \mathcal{L}_p\}$$

-continued $$q_p^t := \sum_{l \in \mathcal{L}_p} \frac{g(s_l^t)}{|\mathcal{L}_p|}.$$

Then, the action representation $z_p^t$ is computed as $z_p^t = \Sigma_{l \in L_p} w_l^t \times g(s_l^t)$. For instance, the action representation can be independent of the number of participating lanes in each phase since $L_p$ can have any arbitrary cardinality. Using the average of $g(s_l^t)$ as the query $q_p^t$ in the state-attention, allows the model to learn the importance of each lane-traffic compared to the average traffic. For example, whenever all lanes are either full or mostly empty, the query detects the situation and in turn, the state attention model 1630 assigns appropriate weights to each lane.

As shown in FIG. 16B, in one or more embodiments, to capture the sequential information of active actions, a long short-term memory (LSTM) cell of a neural network 1662 (e.g., a recurrent neural network, RNN) is used in a stage 1660. A representation of entry points of a respective action can be input into the neural network 1662 to capture sequential information of active actions. For instance, at every time step, the action representation $z_p^t$ of the active actions, e.g., the phase associated with the current green light is fed into the cell. LSTM uses a hidden memory $h^t$ to store an encoded sequence of active actions in previous times and produces an output $o^t$. Then, the action-attention model 1680 provides the probability $\pi^t := \{\pi_p^t, p \in P\}$ of switching to any of the phases in the next time step using $\pi^t$=action-attention($\{z_p^t, p \in P\}, o^t$).

In this example, a computing system optionally trains the state attention computer model on the training data by training on the input of the first set of inputs embedded into multiple dimensions as shown in the embedding stage 1620. Embedding into multiple dimensions each input of the first set of inputs increases representation of an individual input in the neural network 1662 of stage 1660. In this example, the reinforcement learning model 1600 was trained using a variance-reduce variant of REINFORCE, but other types of reinforcement learning algorithms are possible (e.g., Actor-Critic, A2C, and A3C).

The attentional mechanisms in the reinforcement learning model 1600 can allow unified system representations by handling variable-length inputs. For instance, each state of training data can comprise an adjustable number of inputs pertaining to a respective first set of objects in a given environment (e.g., a variable number of objects entering or waiting to enter the environment). Candidate actions in the environment, or other environments in which the reinforcement learning model 1600 is applied, can indicate one or more of a prioritized entry to and exit from a respective environment. For instance, in the context of a traffic environment, the candidate actions can control which lane gets to proceed into the traffic intersection.

A goal of traffic control is often to minimize the average travel time of all vehicles within a finite time frame. However, the travel time is not a direct function of state and action so in practice it may be better to optimize it indirectly. In one or more embodiments, an alternative reward measure can be used (e.g., pressure defined as the absolute value of the total number of waiting vehicles in entering lanes minus the total number of leaving vehicles). Minimizing pressure is equivalent to minimizing the average travel time. For instance, the reward for each time step, can be the negative of intersection pressure. The reinforcement learning model 1600 can provide an appropriate mapping of the states to probability of taking actions for different intersection configurations, regardless of the number of roads, lanes, traffic movements, and number of phases. The reinforcement learning model 1600 is invariant to the order of lanes or phases, so how to enumerate these components will result in the same control decisions.

In one or more embodiments, where the first environment was a first intersection (e.g., intersection 1500 in FIG. 15A), a reinforcement learning model, e.g., the reinforcement learning model 1600 represented in FIGS. 16A-16B, may be trained by receiving, for a respective state of the multiple states, one or more current traffic light signals for the first environment. The computing system may receive additional information for evaluating the traffic light choices. For instance, a computing system can receive, for a respective state of the multiple states, one or more traffic indicators for vehicles waiting or entering the first intersection (e.g., a number of vehicles in a lane; a distance between vehicles; and a distance to a boundary of a given intersection). The computing system can learn the best strategies for managing that traffic pressure. For instance, the computing system can evaluate actions in the first environment in relation to an objective related to a user-defined goal for the one or more traffic indicators.

Figure 17:
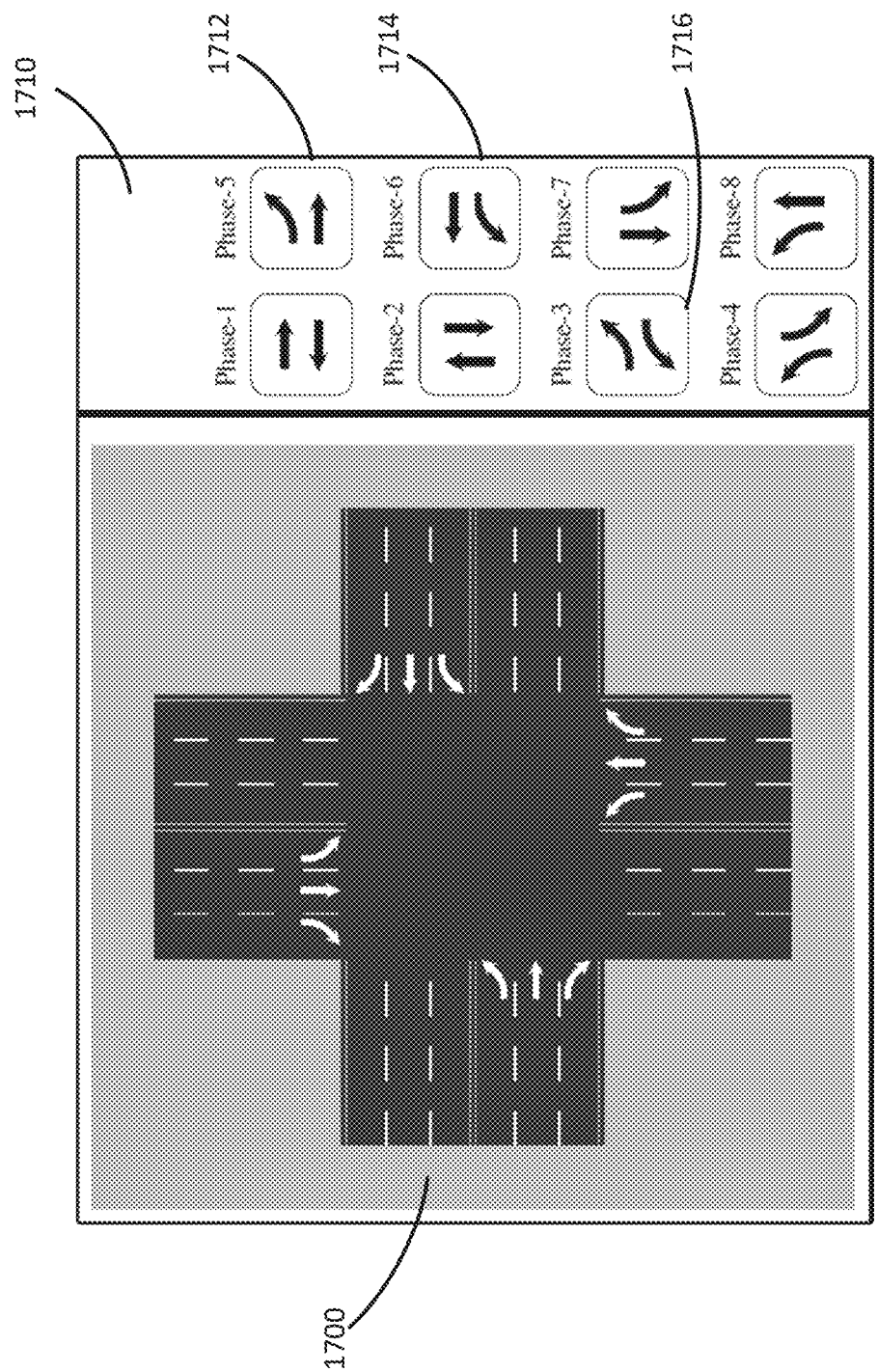
FIG. 17 illustrates an example second environment and candidate phases in at least one embodiment of the present technology.

Once trained the reinforcement learning model can be applied to a second environment. FIG. 17 illustrates an example second environment with a second intersection 1700 and candidate actions 1710 that are phases for the intersection 1700. The set of candidate phases may be a set of candidate actions for the second intersection (e.g., actions taken by a traffic signal controller).

A computing system may receive input data indicating a current traffic light signal for a first lane of the second intersection (e.g., according to phase 1712). The input data may further indicate one or more traffic indicators for vehicles waiting or entering the second intersection. For instance, a computing system may receive input data autonomously from user interaction by receiving video data of objects waiting or entering the second environment, and extracting at time intervals in the video data one or more metrics related to the objects waiting or entering the second environment (e.g., a number of cars waiting at each lane).

A computing system can output to the second environment to change the current traffic light signal and at least one traffic light of a second lane of the second intersection (e.g., to change to phase 1714). For instance, the computing system can send a selection to the second environment to implement a given transition of a selected phase selected from the set of candidate actions 1710 that closest approaches the user-provided goal for the one or more traffic indicators.

In one or more embodiments, the computing system may be deploying the model in an environment with greater complexity than an environment used to train the model. For instance, intersection 1700 in FIG. 17 is more complex than the intersection 1500 in FIG. 15A. For instance, intersection 1700 has a greater number of entry points that intersection 1500 (i.e., it has more lanes). Intersection 1700 also has a greater amount of candidate actions 1710 than the candidate actions 1550 for intersection 1500. Further, candidate actions 1710 includes different transitions than seen in the candidate actions 1550. For instance, while phase 1560 includes the same movements through an intersection as phase 1712, movements in phase 1716 are not found in the candidate actions 1550.

The computing system outputting a selection for the second environment with intersection 1700 can be the same or a different computing system as the one that was used to train the reinforcement learning model. For instance, a first environment for training a reinforcement learning model may be a simulated environment of an intersection so that scenarios can be tested without endangering or unnecessarily delaying real people in an intersection. A second computing system can be used to deploy the trained model in a second environment that comprises a physical environment. The computing system can generate the indication of the selected action in this second environment without retraining the reinforcement learning model for the physical environment.

In one or more embodiments, while the computing system need not retrain the reinforcement learning model, the computing system may refine or update the reinforcement learning model. For instance, the computing system can observe and capture an outcome of the selection output for the second environment and generate a reward indication for the outcome of the selection output for the second environment. The computing system can refine the reinforcement learning model based on reward indication for the second environment or produce an updated reinforcement learning model specific to the second environment.

Figure 18A:
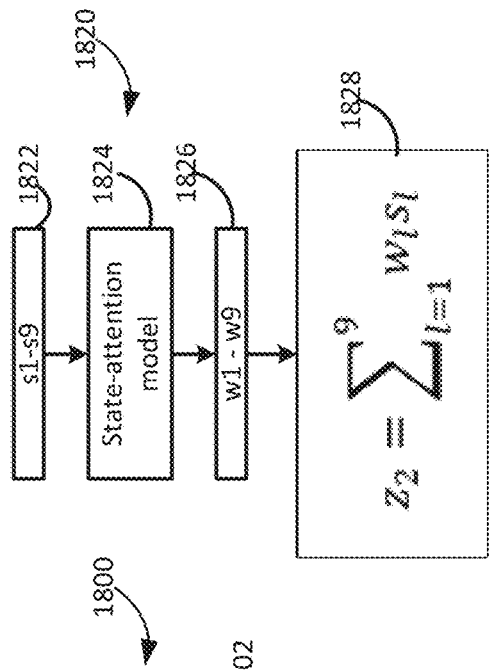
FIGS. 18A-18D illustrate example state-attention model flow diagrams for actions in at least one embodiment of the present technology.
Figure 18B:
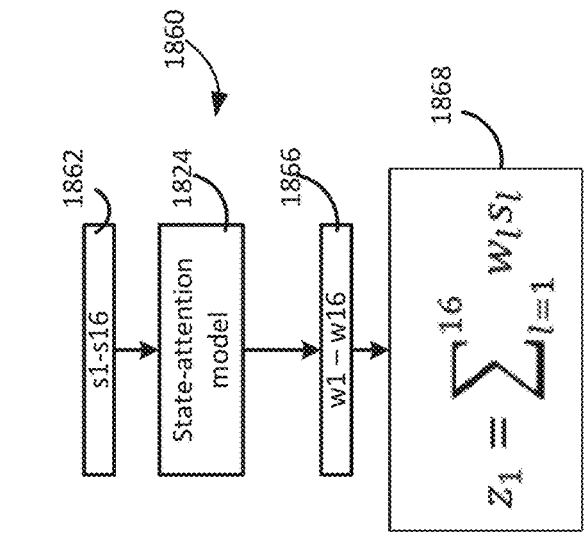
Figure 18C:
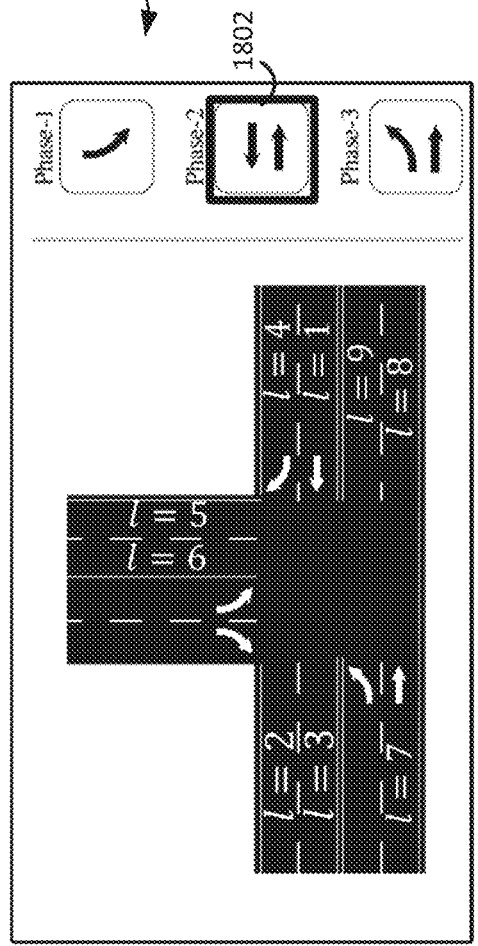

FIGS. 18A-18D illustrate example state-attention model flow diagrams for phases for two different environments with at least three phases: a first environment 1800 in FIG. 18A and a second environment 1840 in FIG. 18C. To account for these different environments, a model (e.g., the reinforcement learning model 1600) accounts for variable length input. For example, FIG. 18A shows a phase-2 1802 that has the same movements as the phase-1 1841 in FIG. 18C. However, a model can produce different action representations for these phases accounting for the different environments (e.g., the different number of lanes).

Figure 18D:
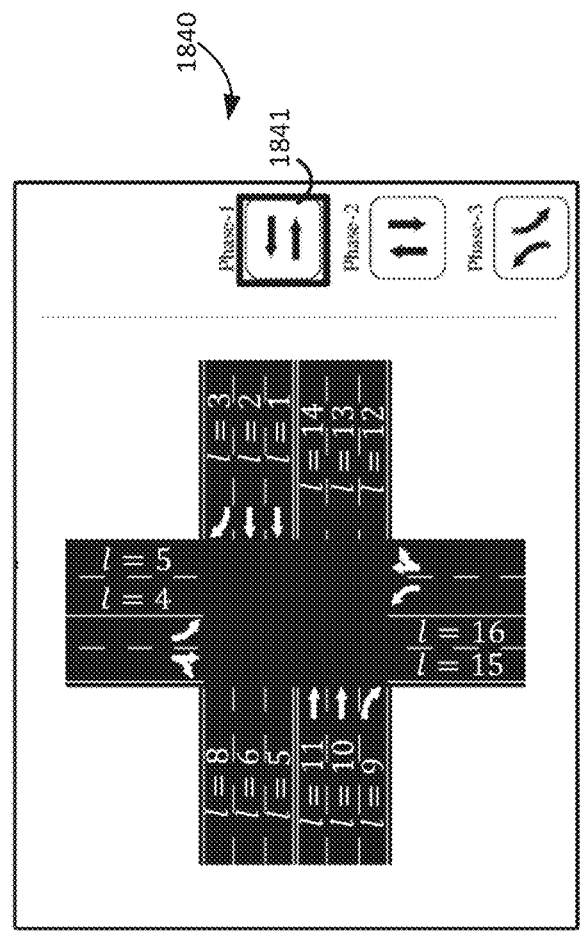

In the example shown in FIGS. 18B and 18D, flow diagrams 1820 and 1860 show flow diagrams for determining an action representation for a same phase in the different environments 1800 and 1840, respectively (i.e., phase-2 1802 and phase-1 1841). The flow diagram 1820 in FIG. 18B comprises operation 1824 for a state-attention model aspect of a model for the first environment 1800. The flow diagram 1820 takes in inputs (s1-s9) for the 9 lanes in operation 1822 and outputs weights (w1-w9) in operation 1826. These weights can then be used to produce action representations (z) in an operation 1828 for the phase-2 1802. In FIG. 18D the flow diagram 1860 for second environment 1840 receives a different number of inputs (s1-s16) in an operation 1862. However, the operation 1824 can occur in flow diagram 1860 because the state-attention model aspect can also be applied to the second environment 1840. In this case the operation 1824 for the state-attention model will produce a different number of weights in an operation 1866 (w1-w16) and a different action representation in operation 1868 for phase-1 1841. Accordingly, using a same model, embodiments herein can account for different environments.

In the example in FIGS. 18A-18D, the state-attention model produces a unified state representation from a varying number of lane-traffic information. The state attention learns the importance of each lane-traffic $g(s_l^t)$ and the weighted sum of them creates the phase-state $z_l^t$. Other operations are possible. For instance, a computing system could simply use the average operator instead of the state-attention. In other words, just use equal weight $1/|L_p|$ for all participating lane-traffic $g(s_l^t)$ in phase p.

In these examples, reinforcement learning models can be created using different regimes for sampling process: (i) a "single-env" regime where a model according to embodiments herein is trained for a single environment and deployed on the same environment, and (ii) a "multi-env" regime where a model according to embodiments herein is trained on multiple environments and can be deployed on multiple environments. For instance, in a single-env regime, a computing system uses a particular environment instance m to train a policy and deploy the model on the same environment instance m. In a multi-env regime, in each episode of training, the computing system samples n environments from M and runs the train-step based on all those environments. For example, M can be a set of intersections, where each intersection instance m∈M is associated with a known intersection topology and traffic-data.

Figures 19A, 19B:
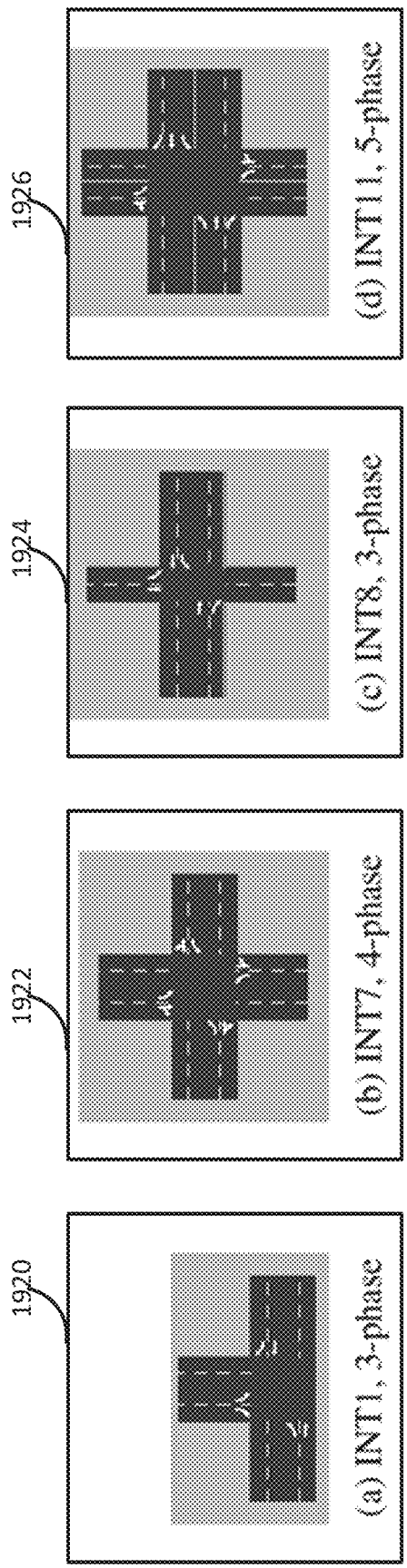
FIGS. 19A-19D illustrate the environment description and the performance results in a single environment regime in at least one embodiment of the present technology.

FIGS. 19A-19D illustrate performance results according to a single environment testing regime. To train and test a reinforcement learning algorithm according to a reinforcement learning model 1600, a combination of real-world and synthetic traffic-data is utilized. Table 1900 in FIG. 19A shows summaries of different roads, lanes, and phases for different tested intersections. For 4-way intersections with two lanes per road, real-world traffic-data of intersections in Hangzhou and Atlanta were collected. For the rest of the intersections, slightly adapted version of these datasets is used due to lack of available real-world data for these intersections. The combination of intersection topologies, their available phases, and traffic-data provides for a set of intersections M with 112 unique intersection instances. A variety of common intersection configurations are considered with {2,3,4,5,8} phases, {1,2,3} lanes, {3,4} ways, and one- and bi-directional intersections.

In all experiments, the number of moving and waiting vehicles represent traffic characteristic $s_l^t$. To this order, first, for lane l a computing system considers a segment of 300 meters from the intersection and splits it into three chunks of 100 meters. Then, $\alpha_{l,c}^t$ for c=1,2,3 is the number of moving vehicles in chunk c of the lane l at time t. Also, $\beta_l^t$ as the number of waiting vehicles at lane l at time t. The traffic characteristic of lane l is represented by $s_l^t:=[\alpha_{l,1}^t, \alpha_{l,2}^t, \alpha_{l,3}^t, \beta_l^t]$.

In this example in FIGS. 19A-19D, the traffic always can turn to the right unless there is conflicting traffic or there is a "no turn on red" signal. To clear the intersection, the green light is followed by 5 seconds of yellow light. For each intersection, the computing system runs the planning for the next 600 seconds with a minimum active time of 10 seconds for each phase. To simulate the environment, CityFlow is used which is a multi-agent reinforcement learning environment for large scale city traffic scenarios.

Figure 19C:
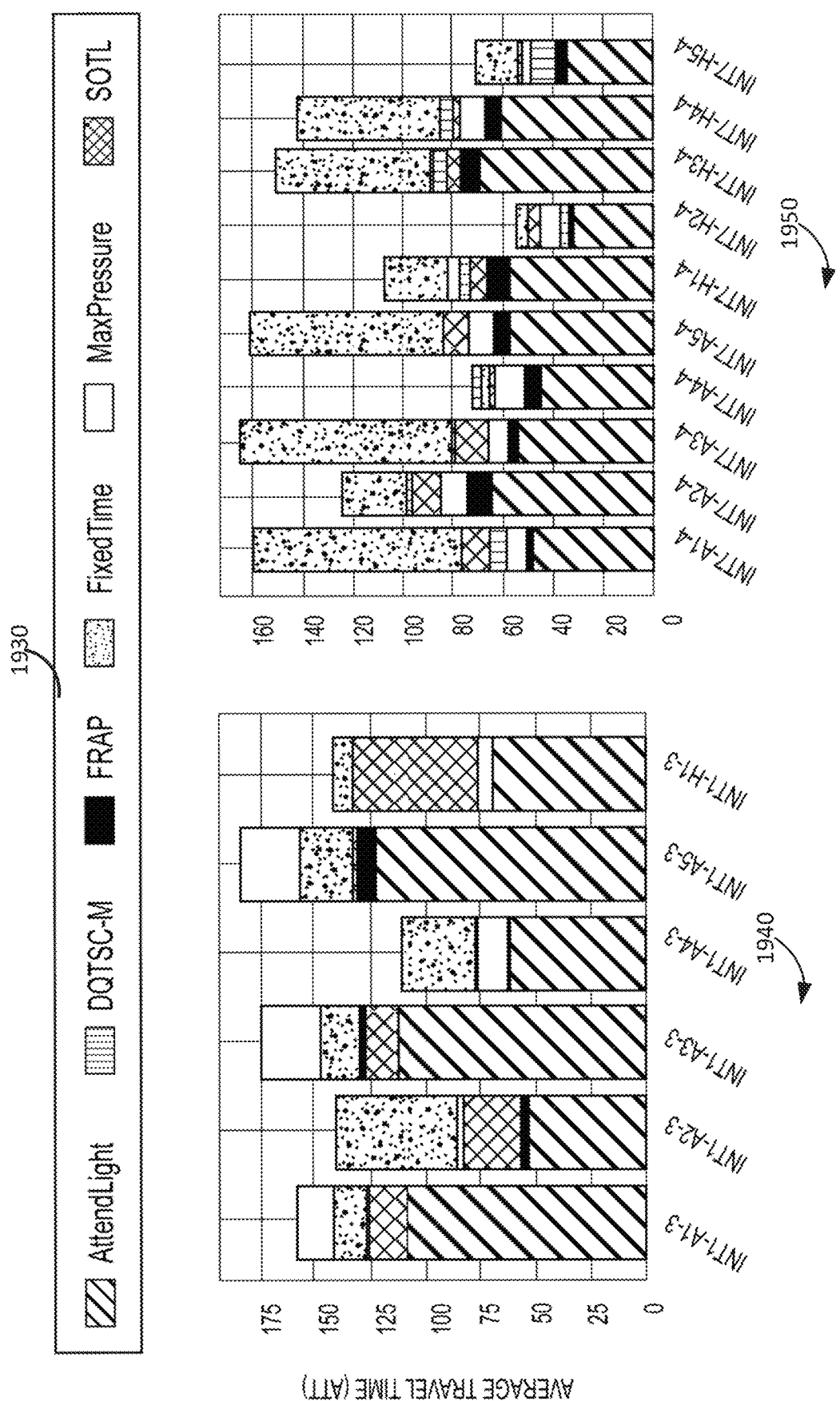
Figure 19D:
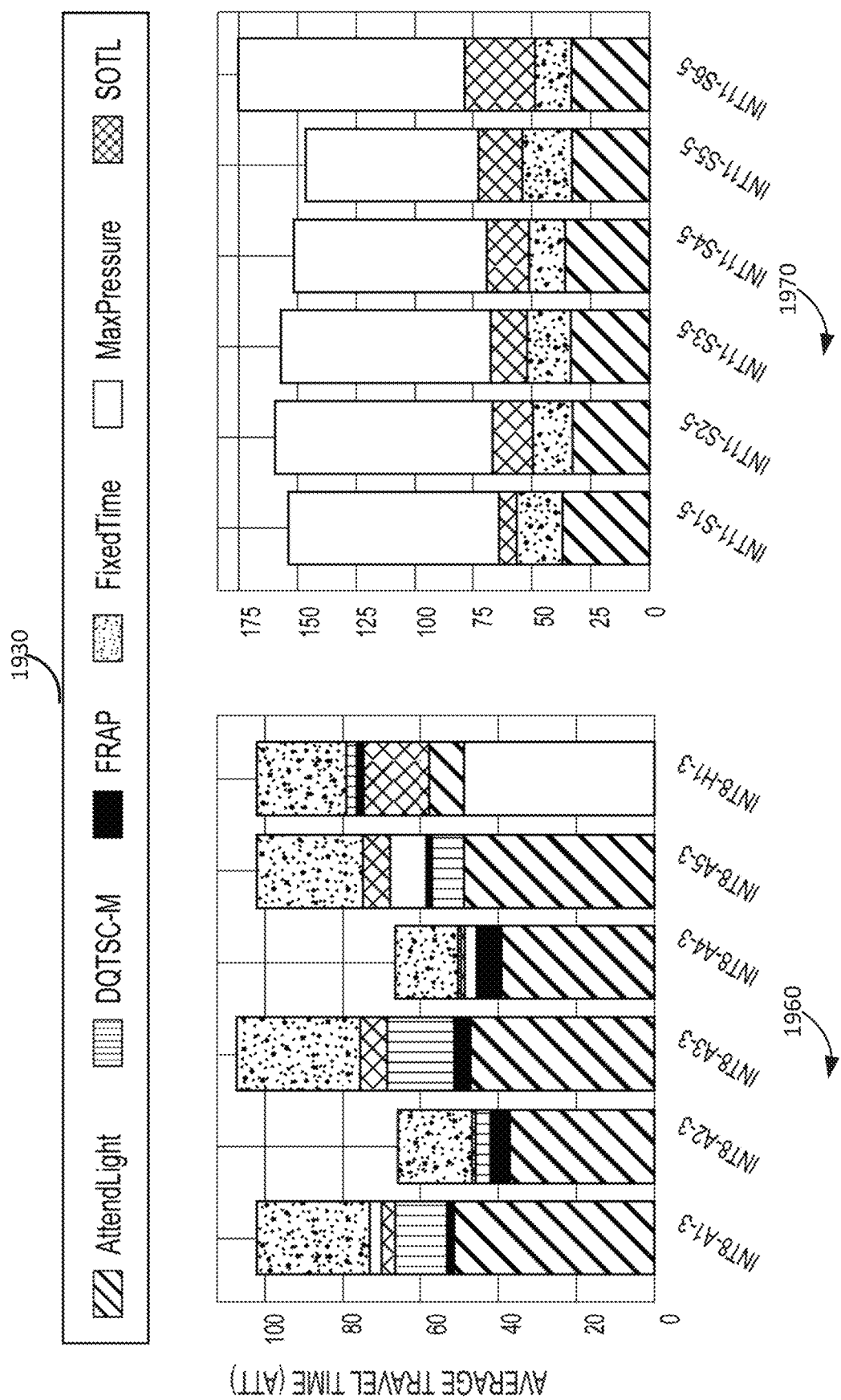

Example representations of sample intersections is shown in FIG. 19B. For instance, intersection 1920 shows an intersection corresponding to intersection ID (INT1) in Table 1900, intersection 1922 shows an intersection corresponding to intersection ID (INT7) in Table 1900, intersection 1924 shows an intersection corresponding to intersection ID (INT8) in Table 1900, and intersection 1926 shows an intersection corresponding to intersection ID (INT11) in Table 1900. Results of these intersection testing is shown in FIGS. 19C-19D. Specific intersections were tested according to these different types with intersections denoted in the graph with each intersection instance by INT #-dataID-#phase. DataID stands for the location (e.g., H1-H5 location corresponds to data derived from locations in Hangzhou, China and A1-A5 corresponds to data derived from Atlanta, Ga., USA).

In this experiment in FIGS. 19A-19D, a reinforcement learning model 1600 for ATTENDLIGHT™ is trained for a particular intersection instance and then tested for the same intersection configuration (i.e., according to a single-env regime). Performance was compared to other types of traffic control approaches including SOTL, Max-pressure, Fixed-time policies, DQTSC-M, and FRAP in FIGS. 19C-19D.

The SOIL algorithm switches between active phases in a cyclic manner when a current phase is more than a threshold. In this example, the phase was switched when the count of cars behind the phases with a red signal was greater than max-red-count threshold value and cars behind the phase with the green signal was less than a min-green-count threshold value. To determine the threshold values, a grid search was performed for sets between 2 and 62 for this value max-red-count threshold value and sets between 2 and 33 for the min-green-count threshold value.

A fixed-time approach is the most common approach in real-world intersections with the lights cycling in a specific order based on a time schedule. In this testing a 15 second phase between lights switches was used.

A Max-Pressure approach considers the pressure of participating lanes for each phase and activates the phase with the highest pressure for the next time step (e.g., the lights with the most cars waiting).

In DQTSC-M, CityFlow was used to get state and reward for each time step with three convolutional layers with filter sizes 2×4, 2×4, and 3×3, with stride of 1×2, 1×2, and 1×3 used in the layer one, two and three, respectively. The output of the convolution layers is passed into a fully connected layer with 128 nodes followed by another fully connected layer of 64 nodes and the last layer provides a Q-value of each possible action.

FRAP is a publicly available code that has several limitations. First it assumes each phase involves exactly two traffic movements and the number of traffic movements in all phases must be the same. Accordingly, FRAP design does not handle all intersections considered, so is compared when possible.

For comparison, an Average Travel Time (ATT) is collected for all algorithms. FIGS. 19C-19D show plots of ATT in graphs 1940, 1950, 1960, and 1970 according to a key 1930. As is shown, in most cases ATTENDLIGHT outperforms benchmarks algorithms in terms of ATT. While FRAP is the second-best working algorithm, it is not applicable in all cases (e.g., it was not applicable to intersections tested and plotted in graph 1970). As expected, FixedTime approaches (where intersections are not adaptive, but rather are controlled on a fixed schedule) typically performed quite poorly. FixedTime performed predominately the worst in graph 1950 and graph 1960. When considering all 112 cases single environments, ATTENDLIGHT yields 46%, 39%, 34%, 16%, and 9% improvement over FixedTime, Max-Pressure, SOIL, DQTSC-M, and FRAP, respectively. Thus, when ATTENDLIGHT is used solely to train a single environment, it works well for all the available number of roads, lanes, phases, and all traffic-data.

As shown in FIGS. 19A-19D, ATTENDLIGHT is responsive to the dynamic behavior of traffic movement and provides a control policy to an intersection to minimize the travel time, which performs better than other models. Minimizing travel time means less traffic at an intersection, lower fuel consumption and a cleaner environment from waiting car emissions. Extending ATTENDLIGHT to control a network of intersections, will increase these benefits.

Further, in contrast to other models, ATTENDLIGHT does not need to be trained for every new intersection. ATTENDLIGHT comprises a universal model that can be simply deployed for a new type of intersection after it is trained over a collection of distinct intersections. Refraining from designing a new model saves human time, computational power, and data collection resources.

Embodiments herein advantageously provide solutions for a multi-environment testing regime not found in other approaches for control of traffic intersections and do not require retraining or transfer learning requirements. For example, in a FRAP algorithm a trained model for a 4-way intersection needs to be changed through reducing the neurons as well as zero-padding modifications to make it compatible for a 3-way intersection. This MetaLight FRAP algorithm needs to re-train its model parameter for a new intersection. A multi-agent reinforcement learning algorithm trains a single agent for an individual intersection and then applies transfer learning to obtain another model for a 2-intersection structure. Similarly, a model for a 3-intersection structure can be obtained from a 2-intersection. Besides the natural drawbacks of transfer learning, such as the assumption on the data distribution, the multi-agent reinforcement learning model is not robust in terms of the number of approaching roads, lanes, and phases. For example, a trained model for a single 4-way intersection cannot be directly transferred to a 3-way one.

Figure 20:
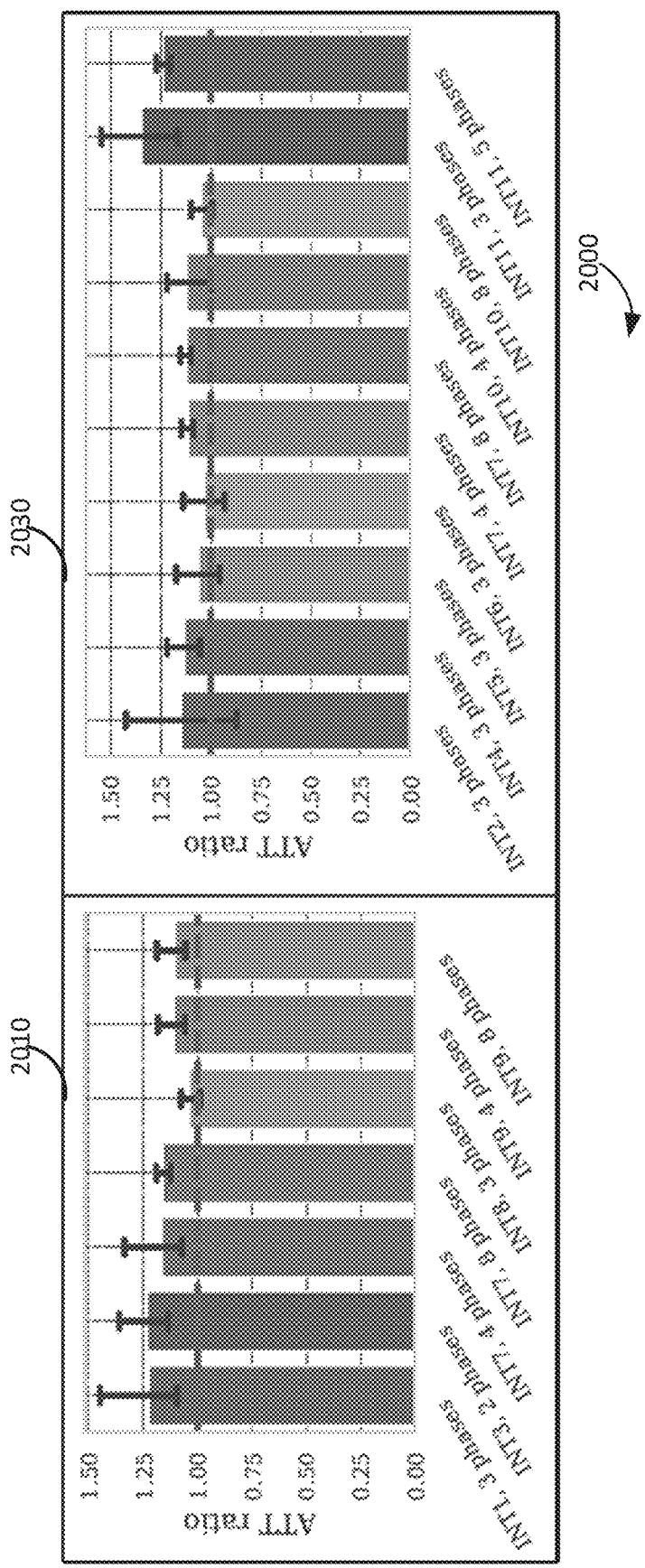
FIGS. 20-21 illustrate performance results in a multiple environment regime in at least one embodiment of the present technology.
Figure 21:
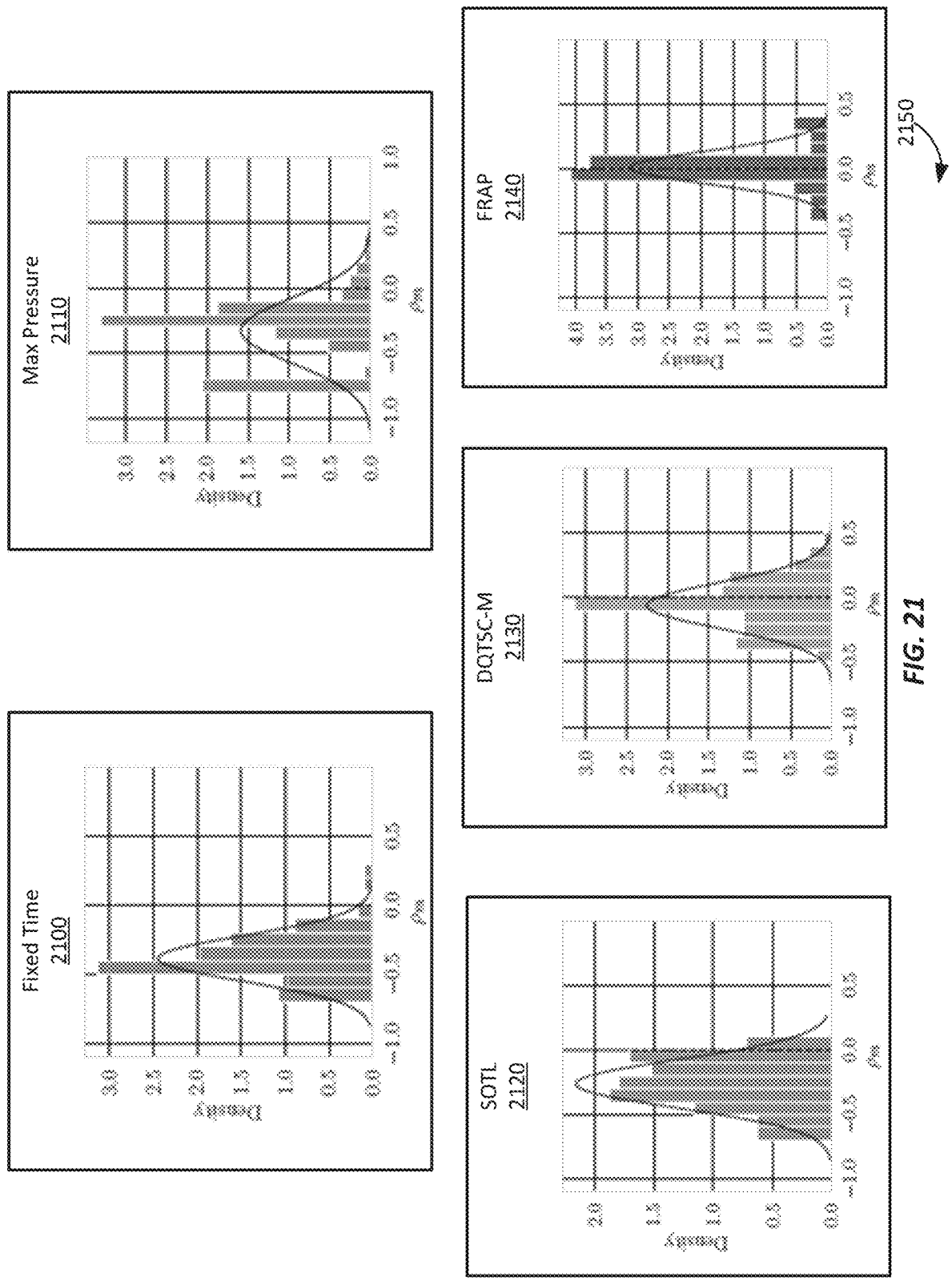

Since there was not known reinforcement-learning based algorithms that were capable of more than one intersection instance without transfer learning or retraining, the multi-env regime is compared against baseline performance for the single-env regime. FIGS. 20-21 illustrate performance results in a multi-environment testing regime for ATTENDLIGHT.

In the example in FIGS. 20-21, a computing system divides the set of intersection instances into two segments: training and testing sets, each with 42 and 70 instances, respectively. ATTENDLIGHT is trained by running all 42 training intersection instances in parallel to obtain data for the training and use the REINFORCE algorithm to optimize the trainable parameters. Once the trained model is available, the performance is tested on training and testing instances. The testing set includes new intersection topologies as well as new traffic-data that has not been observed during training. Five models were trained with different random seeds and average statistics obtained.

In this example, in FIG. 20 an ATT ratio is computed and plotted in graphical user interface 2000. The ATT ratio is ATT in multi-env divided by ATT of the single-env regime. The closer ATT ratio is to one, the less degradation is caused as a result of using a multi-env model. FIG. 20 summarizes the ATT ratio for all 112 intersection instances. Each bar in this plot illustrates the average ATT ratio for traffic-data associated with an intersection configuration and the error bars represent the 95% confidence interval. Graph 2010 represents the ATT ratio for intersection instances that participated in training and graph 2030 represents the ATT ratio for intersection instances that participated in testing. In graph 2010, in most cases the results of the multi-env regime are close to that of the single-env regime. There is an average 15% ATT degradation with a standard deviation of 0.15. A large degradation would indicate how the multi-env regime exacerbates the ATT in a training set by having a general model as opposed to a specific model in a case. In graph 2030, the trained policy works well in most intersection/traffic-data such that on average has 13% ATT gap with a standard deviation of 0.19. Furthermore, from FIG. 20, there are several intersection instances that the model trained in the multi-env regime has lower ATT. This could occur from knowledge sharing between intersections, meaning that environments are sharing successful phase controls that are not necessarily explored in single-env training cases.

FIG. 21 shows comparison of the multi-env regime to single-env regime for the other benchmark algorithms considered in FIGS. 19C-19D. Density ($\rho_m$) plots 2150 are generated according to the equation:

$$\rho_m = \frac{u_m - b_m}{\max(u_m, b_m)} \in [-1, 1], \forall\, m \in M,$$

in which $u_m$ is the ATT of intersection m when the trained model of multi-env is scored greedily (i.e., let the phase with the highest probability be the next active phase), and $b_m$ is the ATT of the corresponding intersection of a certain benchmark algorithm. Having $\rho_m<0$ means that the multi-env model outperforms the baseline algorithm. The density plots 2150 of FIG. 21 show the distribution of $\rho_m$ for all m∈M and for different baseline algorithms. Graphs 2100, 2110 and 2120 indicate that multi-env regime obtains smaller ATT when compared to FixedTime, MaxPressure, and SOTL, respectively. Noting that the fitted Normal distribution is centered at a negative value and only a small tail of the distribution lies on the positive side suggests that the multi-env model almost always has a smaller ATT. As graph 2130 suggests, there are few cases where DQTSC-M obtains smaller ATT and in average ATTENDLIGHT multi-env regime achieves smaller ATT than DQTSC-M. Graph 2140 shows that multi-env ATTENDLIGHT provides competitive performance with respect to FRAP, which is trained on single-env settings, and has other limitations as to what intersection it is applicable.

Accordingly, the multi-env algorithm works well in the training set and obtains quite a small gap in unseen environment instances. The model can be used without retraining on new intersection instances like those observed during training.

Figure 22A:
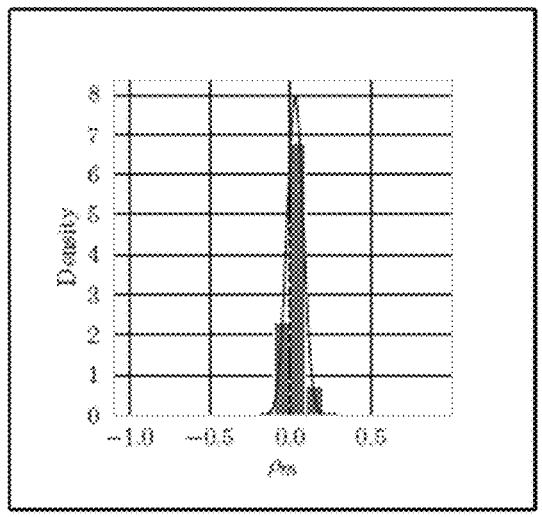
FIG. 22A-22D illustrate performance results for variations of the reinforcement learning model in at least one embodiment of the present technology.

FIGS. 22A-22D illustrate performance results for variations of the reinforcement learning model. In FIG. 22A, the ATTENDLIGHT framework is modified to use an average operator instead of the state-attention as a variation described herein and the single-env model re-trained for all 112 environment instances. FIG. 22A shows the distribution of p for the ATT ratio of mean-state over the attention-state. The average is on the positive side, meaning that the ATT of mean-state are bigger than those in with the state-attention. Therefore, utilizing a state-attention model (e.g., state attention model 1630) helps to achieve smaller ATT.

Although the multi-env regime works well, in some scenarios it may be good to have a specialized policy for an important intersection. For example, a universal policy may be created and after a few training steps, an improved policy can be obtained for that intersection. Recall that ATTENDLIGHT is designed to handle different intersections without the need to modify the structure of the policy network (the number of inputs and outputs). In the multi-env regime, a few-shot training can be used to obtain a specialized policy for a certain intersection. A computing system can start with a trained multi-env policy and calibrate the policy for a specific intersection through a few training steps.

Figure 22B:
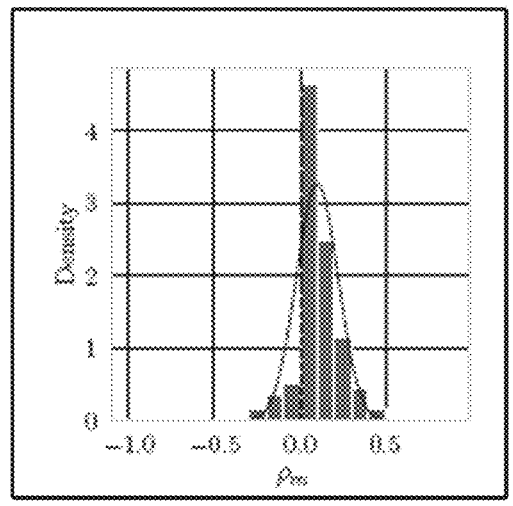
Figure 22C:
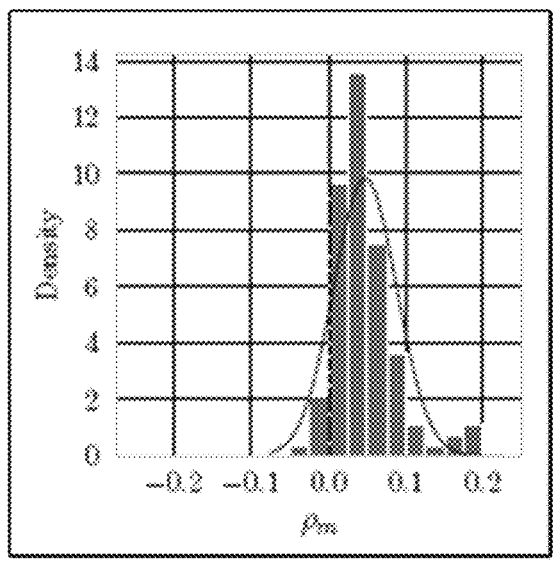
Figure 22D:
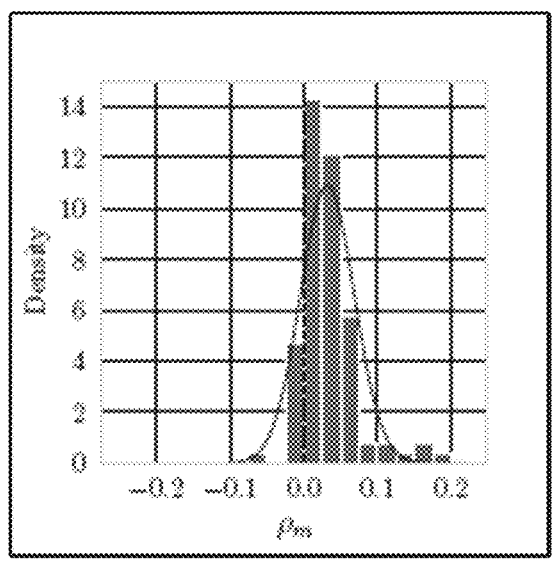

FIGS. 22B-22D show an example of implementing this approach and fine-tuning a policy for each of the 112 environment instances. FIG. 19B shows the distribution of $\rho_m$ which defines $\rho_m$ by the single-env before the fine tuning. FIG. 19C shows the distribution of $\rho_m$ after fine-tuning according to 200 episodes. FIG. 19D shows the distribution of $\rho_m$ after fine-tuning according to 1000 episodes. As it is shown, after 200-episode of fine-tuning the distribution of ρ is concentrated close to zero with a small standard deviation, leaning a bit toward the positive values. With 1000-episode, the distribution is leaned more toward zero with a smaller standard deviation. In these examples, the fine-tuning is quite fast such that it takes 10 and 43 minutes to fine-tune the policy with 200 and 1000 episodes, respectively.

Compared to the result of the single-env regime, the maximum and the average of multi-env gap decrease significantly after 200 training episodes (instead of 100,000 episodes when trained from scratch in single-env regime) such that the ATT-gap decreased to 5% gap in average (without fine-tuning it was 13%). After 1000 training steps, this gap decreased to 3%. Thus, even slight fine-tuning can be used to improve a model without much additional processing.

Embodiments have been described in the context of a traffic environment merely as an example. Teachings herein are applicable to other traffic environments, such as packet traffic. For instance, embodiments are applicable to wireless resource allocation. In this problem, the goal is to efficiently allocate the spectrum and power of the wireless router to its users. Each user may send or receive packets of different sizes. Users as well as packets may have different priorities. Therefore, the main task is to send the packets considering their priority, size, arrival time, etc. to minimize a relevant cost function such as the queue length or the total response time of each request. Embodiments herein can have a state-attention model learn to extract the state of each packet, considering the arrival time, priority, size of the packet, type of the data, and/or other information that may not be available for all packets. Then, the action-attention decides which packet to send next.

Embodiments are applicable to other types of environments. For instance, embodiments are applicable to situations in which the actions relate to transitions for assembly or matching components. In this situation, a given entry point into a respective environment comprise points of multiple objects for matching or assembling.

Figure 23:
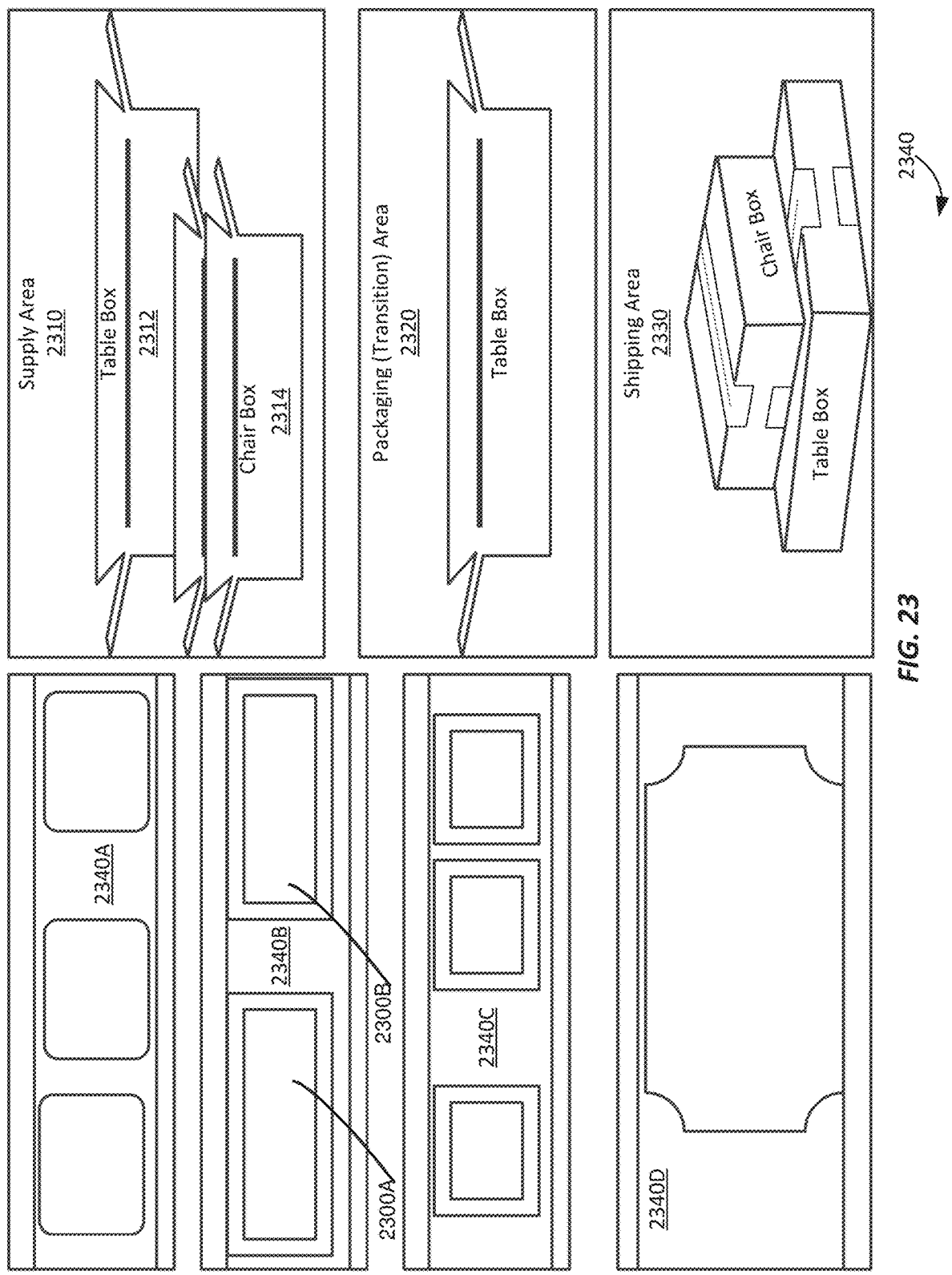
FIG. 23 illustrates an example packaging environment in at least one embodiment of the present technology.

FIG. 23 illustrates an example packaging environment as an example. This example is an assemble-to-order system in which parts of different types need to be assembled into a few known finished products, and the goal is to find the sequence of the products to assemble. For instance, in the example in FIG. 23 the board 2300A on conveyor belt 2340B may be a back to a chair and packed into chair box 2314 or it may be used as a table leg and packed in table box 2312. Since the number and type of input parts may vary among different products, the problem does not have a fixed-sized input. Due to manufacturing delays, boards may not enter at a known rate (e.g., gaps that have formed between boards on conveyer belts 2340A and 2340C). Moreover, the number of orders at each time may change due to the stochasticity of the customer's demand, so the number of output products does not have a fixed size. For example, only one board 2300A may be used in assembling the pieces for the chair box 2314 in the supply area 2310. However, that same board 2300A could instead be one of two boards, board 2300A and board 2300B, put into the table box 2312. Boards enter the packaging area 2320 from entry points of the different conveyer belts 2340. Which box to assemble in the packaging area 2320 to transition the lose boards to a kit to ship out in the shipping area 2330 may depend on these customer demands and available supply of the boards 2300.

In one or more embodiments, a state attention model (e.g., state attention model 1630) extracts the state of each product reflecting the availability of required parts (e.g., the number of boards 2300 waiting to enter the packaging area 2320), numbers of possible finished products (e.g., the number and type of packages in the shipping area 2330), number of unfilled orders, etc. An action-attention model (e.g., action attention model 1680) is responsible for deciding what to produce at each time with the goal of minimizing one or more objectives (e.g., total make-span, tardiness, and delay time).

This packaging situation can be generalized to dynamic matching problems. In dynamic matching problems, entities of different types arrive at the system and wait in the queue until they are matched together. Once a matching happens, the entities immediately leave the system, and some feedback is observed by a computing system in terms of a reward signal. In this example, the objective is to maximize the long-term cumulative reward while keeping the system stable. This problem is a generalization of the assemble-to-order systems, where the entities can be humans, advertisements, commodities, etc. A model described herein (e.g., reinforcement learning model 1600) can be used in this problem to first, extract the state of each matching option from the system state, and then the action attention model aspects (e.g., action attention model 1680) chooses the matchings (e.g., matching with the highest value for a given criteria).

Regardless of the problem (be it traffic problems, assembly problems, dynamic matching problems, or others), one or more embodiments allow for the training of an improved reinforcement learning model for an environment and computer decision making in the same environment or an unseen environment.

What is claimed is:

1. A computer-program product tangibly embodied in a non-transitory machine-readable storage medium, the computer-program product including instructions operable to cause a computing system to:
    access a reinforcement learning model comprising multiple different attention computer model components, wherein the reinforcement learning model was trained on training data of a first environment by:
        receiving the training data indicating multiple states of a respective first set of objects entering or waiting to enter a first environment;
        determining a first set of multiple candidate actions for the respective first set of objects, wherein each respective action of the first set of multiple candidate actions comprise a distinct stage of transition for a subset of objects of the respective first set of objects in the first environment;
        accessing an objective for selecting a respective action of the first set of multiple candidate actions;
        training a state attention computer model on the training data that weighs each of respective inputs of a respective state of the multiple states;
        weighing, from the state attention computer model, each entry point of entry points of the first environment to account for importance for each corresponding entry point according to the objective;
        inputting a representation of entry points of a respective action into a neural network to produce neural network output for the respective action for the respective state of the multiple states;
        training, on the neural network output, an action attention computer model that determines a probability of switching from a first action of the first set of the multiple candidate actions to a second action of the first set of the multiple candidate actions;
        generating, according to the action attention computer model, an indication of a selected action of the multiple candidate actions; and
        receiving, from the first environment, feedback for acting according to the selected action;
    receive input data indicating a first state of a second set of objects entering or waiting to enter a second environment;
    determine a second set of multiple candidate actions for the second set of objects;
    generate an indication of a selected action of the second set of multiple candidate actions for the input data according to the reinforcement learning model comprising the multiple different attention computer model components; and
    send a selection output to the second environment to implement the selected action in the second environment.

2. The computer-program product of claim 1,
    wherein the reinforcement learning model is trained on training data of a single environment that comprises a given number of entry points into the first environment for the respective first set of objects; and
    wherein the reinforcement learning model comprises a single model for multiple different environments, wherein at least one of the multiple different environments comprises a different number of entry points into a respective environment than the first environment.

3. The computer-program product of claim 1,
    wherein the first environment comprises a first intersection;
    wherein the second environment comprises a second intersection;
    wherein the receiving the training data comprises receiving, for a respective state of the multiple states, one or more current traffic signals for the first environment; and
    wherein the instructions are operable to cause the computing system to:
        receive the input data indicating a current traffic signal for a first lane of the second intersection; and
        send the selection output to the second environment to change the current traffic signal and at least one traffic signal of a second lane of the second intersection.

4. The computer-program product of claim 1,
    wherein the first environment comprises a first intersection;
    wherein the second environment comprises a second intersection, and wherein the second set of candidate actions comprises a set of candidate phases for the second intersection;
    wherein the receiving the training data comprises receiving, for a respective state of the multiple states, one or more traffic indicators for vehicles waiting or entering the first intersection;
    wherein the objective relates to a user-defined goal for the one or more traffic indicators; and
    wherein the instructions are operable to cause the computing system to:
        receive the input data indicating one or more traffic indicators for vehicles waiting or entering the second intersection; and send the selection output to the second environment to implement a given transition of a selected phase selected from the set of candidate phases that closest approaches the user-defined goal for the one or more traffic indicators.

5. The computer-program product of claim 4, wherein the one or more traffic indicators for vehicles waiting or entering the first intersection and the one or more traffic indicators for vehicles waiting or entering the second intersection comprise one or more of:
   a number of vehicles in a lane;
   a distance between vehicles; and
   a distance to a boundary of a given intersection.

6. The computer-program product of claim 1,
   wherein the first environment comprises a first intersection;
   wherein the second environment comprises a second intersection;
   wherein a given entry point of entry points of a respective intersection indicates lanes or traffic patterns for a set of lanes; and
   wherein a phase of the first set of multiple candidate actions or the second set of multiple candidate actions describes transitions of a fixed duration of a given traffic pattern in the respective intersection.

7. The computer-program product of claim 1, wherein the second environment has a greater complexity than the first environment because the second environment has one or more of:
   a greater number of entry points for the second environment as the first environment;
   a greater amount of candidate actions in the second set of multiple candidate actions compared to the first set of multiple candidate actions; and
   different transitions in the second environment as the first environment.

8. The computer-program product of claim 1, wherein the instructions are operable to cause the computing system to:
   determine multiple rewards from feedback for acting according to each selection for the multiple states corresponding to each time step of an episode for the training data; and
   train the reinforcement learning model using a policy gradient reinforcement learning algorithm to maximize the multiple rewards over time.

9. The computer-program product of claim 1, wherein the instructions are operable to cause the computing system to receive the training data by receiving for a respective state of the multiple states:
   a current action for the first environment; and
   one or more attributes for objects waiting or entering the first environment.

10. The computer-program product of claim 1, wherein the instructions are operable to cause the computing system to receive the input data by:
    receiving video data of objects waiting or entering the second environment; and
    extracting at time intervals in the video data one or more metrics related to the objects waiting or entering the second environment.

11. The computer-program product of claim 1,
    wherein the first environment comprises a simulated environment;
    wherein the second environment comprises a physical environment; and
    wherein the instructions are operable to cause the computing system to generate the indication of the selected action without retraining the reinforcement learning model for the physical environment.

12. The computer-program product of claim 1, wherein the instructions are operable to cause the computing system to:
    capture an outcome of the selection output for the second environment;
    generate a reward indication for the outcome of the selection output for the second environment; and
    refine the reinforcement learning model based on the reward indication for the outcome of the selection output for the second environment, or produce an updated reinforcement learning model specific to the second environment.

13. The computer-program product of claim 1, wherein the reinforcement learning model was further trained by:
    receiving a first set of inputs in the training data pertaining to a first state of the respective first set of objects;
    embedding into multiple dimensions each input of the first set of inputs to increase representation of an individual input in the neural network; and
    training the state attention computer model on the training data by training on the input of the first set of inputs embedded into multiple dimensions.

14. The computer-program product of claim 1, wherein the inputting the representation of entry points of the respective action into a neural network comprises inputting into a long short-term memory (LSTM) cell of a recurrent neural network (RNN) to capture sequential information of active actions.

15. The computer-program product of claim 1,
    wherein each state of the training data comprises an adjustable amount of inputs pertaining to the respective first set of objects;
    wherein the adjustable amount of inputs comprises a variable number of objects entering or waiting to enter the first environment; and
    wherein a respective action of the first set of multiple candidate actions and the second set of multiple candidate actions indicates one or more of a prioritized entry to and exit from a respective environment.

16. The computer-program product of claim 1,
    wherein the respective first set of objects and the second set of objects comprise components that are assembled or matched in a respective environment; and
    wherein a given entry points of entry points of a respective environment comprise points of multiple objects for matching or assembling.

17. A computer-implemented method comprising:
    accessing a reinforcement learning model comprising multiple different attention computer model components, wherein the reinforcement learning model was trained on training data of a first environment by:
       receiving the training data indicating multiple states of a respective first set of objects entering or waiting to enter a first environment;
       determining a first set of multiple candidate actions for the respective first set of objects, wherein each respective action of the first set of multiple candidate actions comprise a distinct stage of transition for a subset of objects of the respective first set of objects in the first environment;
       accessing an objective for selecting a respective action of the first set of multiple candidate actions;
       training a state attention computer model on the training data that weighs each of respective inputs of a respective state of the multiple states;

weighing, from the state attention computer model, each entry point of entry points of the first environment to account for importance for each corresponding entry point according to the objective;

inputting a representation of entry points of a respective action into a neural network to produce neural network output for the respective action for the respective state of the multiple states;

training, on the neural network output, an action attention computer model that determines a probability of switching from a first action of the first set of the multiple candidate actions to a second action of the first set of the multiple candidate actions;

generating, according to the action attention computer model, an indication of a selected action of the multiple candidate actions; and receiving, from the first environment, feedback for acting according to the selected action;

receiving input data indicating a first state of a second set of objects entering or waiting to enter a second environment;

determining a second set of multiple candidate actions for the second set of objects;

generating an indication of a selected action of the second set of multiple candidate actions for the input data according to the reinforcement learning model comprising the multiple different attention computer model components; and sending a selection output to the second environment to implement the selected action in the second environment.

18. The computer-implemented method of claim 17, wherein the reinforcement learning model is trained on training data of a single environment that comprises a given number of entry points into the first environment for the respective first set of objects; and wherein the reinforcement learning model comprises a single model for multiple different environments, wherein at least one of the multiple different environments comprises a different number of entry points into a respective environment than the first environment.

19. The computer-implemented method of claim 17, wherein the first environment comprises a first intersection;

wherein the second environment comprises a second intersection;

wherein the receiving the training data comprises receiving, for a respective state of the multiple states, one or more current traffic signals for the first environment;

wherein the receiving the input data comprises receiving input data indicating a current traffic signal for a first lane of the second intersection; and wherein the sending the selection output comprises sending the selection output to the second environment to change the current traffic signal and at least one traffic signal of a second lane of the second intersection.

20. The computer-implemented method of claim 17, wherein the first environment comprises a first intersection;

wherein the second environment comprises a second intersection, and wherein the second set of candidate actions comprises a set of candidate phases for the second intersection;

wherein the receiving the training data comprises receiving, for a respective state of the multiple states, one or more traffic indicators for vehicles waiting or entering the first intersection;

wherein the objective relates to a user-defined goal for the one or more traffic indicators;

wherein the receiving the input data comprises receiving the input data indicating one or more traffic indicators for vehicles waiting or entering the second intersection; and wherein the sending the selection output comprises sending the selection output to the second environment to implement a given transition of a selected phase selected from the set of candidate phases that closest approaches the user-defined goal for the one or more traffic indicators.

21. The computer-implemented method of claim 20, wherein the one or more traffic indicators for vehicles waiting or entering the first intersection and the one or more traffic indicators for vehicles waiting or entering the second intersection comprise one or more of:

a number of vehicles in a lane;

a distance between vehicles; and a distance to a boundary of a given intersection.

22. The computer-implemented method of claim 17, wherein the first environment comprises a first intersection;

wherein the second environment comprises a second intersection;

wherein a given entry point of entry points of a respective intersection indicates lanes or traffic patterns for a set of lanes; and wherein a phase of the first set of multiple candidate actions or the second set of multiple candidate actions describes transitions of a fixed duration of a given traffic pattern in the respective intersection.

23. The computer-implemented method of claim 17, wherein the second environment has a greater complexity than the first environment because the second environment has one or more of:

a greater number of entry points for the second environment as the first environment;

a greater amount of candidate actions in the second set of multiple candidate actions compared to the first set of multiple candidate actions; and different transitions in the second environment as the first environment.

24. The computer-implemented method of claim 17, wherein the method further comprises:

determining multiple rewards from feedback for acting according to each selection for the multiple states corresponding to each time step of an episode for the training data; and training the reinforcement learning model using a policy gradient reinforcement learning algorithm to maximize the multiple rewards over time.

25. The computer-implemented method of claim 17, wherein the receiving the training data comprises receiving the training data by receiving for a respective state of the multiple states:

a current action for the first environment; and one or more attributes for objects waiting or entering the first environment.

26. The computer-implemented method of claim 17, wherein the receiving the input data comprises:

receiving video data of objects waiting or entering the second environment; and extracting at time intervals in the video data one or more metrics related to the objects waiting or entering the second environment.

27. The computer-implemented method of claim 17,
wherein the first environment comprises a simulated environment;
wherein the second environment comprises a physical environment; and
wherein the generating the indication of the selected action comprises generating the indication of the selected action without retraining the reinforcement learning model for the physical environment.

28. The computer-implemented method of claim 17, wherein the method further comprises:
capturing an outcome of the selection output for the second environment;
generating a reward indication for the outcome of the selection output for the second environment; and
refining the reinforcement learning model based on the reward indication for the outcome of the selection output for the second environment, or producing an updated reinforcement learning model specific to the second environment.

29. The computer-implemented method of claim 17, wherein the reinforcement learning model was further trained by:
receiving a first set of inputs in the training data pertaining to a first state of the respective first set of objects;
embedding into multiple dimensions each input of the first set of inputs to increase representation of an individual input in the neural network; and
training the state attention computer model on the training data by training on the input of the first set of inputs embedded into multiple dimensions.

30. A computing device comprising processor and memory, the memory containing instructions executable by the processor wherein the computing device is configured to:
access a reinforcement learning model comprising multiple different attention computer model components, wherein the reinforcement learning model was trained on training data of a first environment by:
receiving the training data indicating multiple states of a respective first set of objects entering or waiting to enter a first environment;
determining a first set of multiple candidate actions for the respective first set of objects, wherein each respective action of the first set of multiple candidate actions comprise a distinct stage of transition for a subset of objects of the respective first set of objects in the first environment;
accessing an objective for selecting a respective action of the first set of multiple candidate actions;
training a state attention computer model on the training data that weighs each of respective inputs of a respective state of the multiple states;
weighing, from the state attention computer model, each entry point of entry points of the first environment to account for importance for each corresponding entry point according to the objective;
inputting a representation of entry points of a respective action into a neural network to produce neural network output for the respective action for the respective state of the multiple states;
training, on the neural network output, an action attention computer model that determines a probability of switching from a first action of the first set of the multiple candidate actions to a second action of the first set of the multiple candidate actions;
generating, according to the action attention computer model, an indication of a selected action of the multiple candidate actions; and
receiving, from the first environment, feedback for acting according to the selected action;
receive input data indicating a first state of a second set of objects entering or waiting to enter a second environment;
determine a second set of multiple candidate actions for the second set of objects;
generate an indication of a selected action of the second set of multiple candidate actions for the input data according to the reinforcement learning model comprising the multiple different attention computer model components; and
send a selection output to the second environment to implement the selected action in the second environment.

* * * * *

UNITED STATES PATENT AND TRADEMARK OFFICE
CERTIFICATE OF CORRECTION

PATENT NO. : 11,080,602 B1
APPLICATION NO. : 17/177694
DATED : August 3, 2021
INVENTOR(S) : Oroojlooyjadid et al.

It is certified that error appears in the above-identified patent and that said Letters Patent is hereby corrected as shown below:

In the Specification

Column 36, Line 33, delete "lane $l \in L^{in}$", and insert -- lane $l \in L^{in}$ --, therefor.

Column 36, Line 34, delete "lane $l' \in L^{in}$", and insert -- lane $l' \in L^{in}$ --, therefor.

Column 36, Line 38, delete "$l_k^{in}$", and insert -- $l_k^{in}$ --, therefor.

Column 36, Line 39, delete "$l_k^{out}$", and insert -- $l_k^{out}$ --, therefor.

Column 36, Line 46, delete "$l_5^{in}$ or $l_6^{in}$", and insert -- $l_5^{in}$ or $l_6^{in}$ --, therefor.

Column 36, Line 48, delete "lane $l_6^{in}$ and exits on lane $l_1^{out}$", and insert -- lane $l_6^{in}$ and exits on lane $l_1^{out}$ --, therefor.

Column 36, Line 50, delete "$\{l_6^{in} \rightarrow l_1^{out}, l_6^{in} \rightarrow l_2^{out}\}$", and insert -- $\{l_6^{in} \rightarrow l_1^{out}, l_6^{in} \rightarrow l_2^{out}\}$ --, therefor.

Column 36, Line 50-51, delete "$\{l_2^{in} \rightarrow l_3^{out}, l_5^{in} \rightarrow l_4^{out}\}$", and insert -- $\{l_2^{in} \rightarrow l_3^{out}, l_5^{in} \rightarrow l_4^{out}\}$ --, therefor.

Column 36, Line 52, delete "$\{l_5^{in}, l_6^{in}, l_1^{out}, l_2^{out}, l_3^{out}, l_4^{out}\}$.", and insert -- $\{l_5^{in}, l_6^{in}, l_1^{out}, l_2^{out}, l_3^{out}, l_4^{out}\}$. --, therefor.

Column 36, Line 56-57, delete "lane $l_4^{in}$ to turn right while lanes $l_3^{in}$ and $l_2^{in}$", and insert -- lane $l_4^{in}$ to turn right while lanes $l_3^{in}$ and $l_2^{in}$ --, therefor.

Column 36, Line 59-60, delete "lane $l_4^{in}$ and turns right it will go out on lanes $l_5^{out}$ or $l_6^{out}$.", and insert -- lane $l_4^{in}$ and turns right it will go out on lanes $l_5^{out}$ or $l_6^{out}$. --, therefor.

Signed and Sealed this
Second Day of November, 2021

Drew Hirshfeld
*Performing the Functions and Duties of the
Under Secretary of Commerce for Intellectual Property and
Director of the United States Patent and Trademark Office*

CERTIFICATE OF CORRECTION (continued)
U.S. Pat. No. 11,080,602 B1

Column 36, Line 61-62, delete "lane $l_1^{in}$" to turn left while lane $l_2^{in}$", and insert -- lane $l_1^{in}$ to turn left while lane $l_2^{in}$ --, therefor.

Column 38, Line 1, delete "lane l∈L at time t, where L denotes", and insert -- lane $l \in L$ at time $t$, where $L$ denotes --, therefor.

Column 38, Line 10, delete "lanes l∈L", and insert -- lanes $l \in L$ --, therefor.

Column 38, Line 14, delete "l∈L$_p$}", and insert -- $l \in L_p$} --, therefor.

Column 38, Line 47, delete the portion of the formula reading "tan $h$", and insert -- tanh --, therefor.

Column 38, Line 56, delete "l∈L$_p$}", and insert -- $l \in L_p$} --, therefor.